(12) United States Patent
Hong

(10) Patent No.: US 12,013,255 B2
(45) Date of Patent: Jun. 18, 2024

(54) METHOD, APPARATUS, AND COMPUTER PROGRAM PRODUCT FOR CORRECTING LANE GEOMETRY IN MAP DATA

(71) Applicant: HERE GLOBAL B.V., Eindhoven (NL)

(72) Inventor: Soojung Hong, Zurich (CH)

(73) Assignee: HERE GLOBAL B.V., Eindhoven (NL)

( * ) Notice: Subject to any disclaimer, the term of this patent is extended or adjusted under 35 U.S.C. 154(b) by 273 days.

(21) Appl. No.: 17/645,097

(22) Filed: Dec. 20, 2021

(65) Prior Publication Data

US 2023/0194298 A1 Jun. 22, 2023

(51) Int. Cl.
*G01C 21/00* (2006.01)
*G06N 3/08* (2023.01)

(52) U.S. Cl.
CPC ..... *G01C 21/3815* (2020.08); *G01C 21/3867* (2020.08); *G01C 21/3881* (2020.08); *G06N 3/08* (2013.01)

(58) Field of Classification Search
CPC ............ G01C 21/3815; G01C 21/3867; G01C 21/3881; G06N 3/08
USPC .......................................................... 701/45
See application file for complete search history.

(56) References Cited

U.S. PATENT DOCUMENTS

| | | |
|---|---|---|
| 10,816,993 B1 | 10/2020 | Tran |
| 11,023,747 B2 | 6/2021 | Pojman et al. |
| 2019/0129165 A1 | 5/2019 | Kang et al. |
| 2019/0347277 A1 | 11/2019 | Tao et al. |

(Continued)

FOREIGN PATENT DOCUMENTS

| CN | 109886200 A | 6/2019 | |
|---|---|---|---|
| CN | 110825832 A * | 2/2020 | ............. G01C 21/32 |

(Continued)

OTHER PUBLICATIONS

Zheng Hui, et al., "Image Fine-grained Inpainting", Oct. 4, 2020, pp. 1-10 (Year: 2020).*

(Continued)

*Primary Examiner* — Hunter B Lonsberry
*Assistant Examiner* — Helen Li
(74) *Attorney, Agent, or Firm* — ALSTON & BIRD LLP

(57) ABSTRACT

A method is provided to using a machine learning model to predict lane geometry where incorrect or missing lane line geometry is detected. Methods may include: receiving a representation of lane line geometry including a masked area representing an area of broken lane line geometry; processing the representation using an inpainting model including a generator to produce a corrected representation, where the masked area is inpainted to correct the broken lane line geometry, where the generator processes the representation through one or more convolution layers and at least eight dilated convolution layers to generate inpainting of corrected lane line geometry in the corrected representation; processing the corrected representation through a discriminator of the inpainting model, where the discriminator discerns a score reflecting a quality measure of the corrected representations; and updating a map database based on the corrected representation in response to the score satisfying a predetermined threshold.

20 Claims, 16 Drawing Sheets

(56) References Cited

U.S. PATENT DOCUMENTS

| | | | |
|---|---|---|---|
| 2020/0285862 A1* | 9/2020 | Pojman | G06V 10/82 |
| 2021/0150678 A1 | 5/2021 | Yi et al. | |
| 2021/0264167 A1 | 8/2021 | Chen et al. | |
| 2022/0156894 A1 | 5/2022 | Grünwedel et al. | |

FOREIGN PATENT DOCUMENTS

| | | |
|---|---|---|
| CN | 112836573 A | 5/2021 |
| DE | 102019131971 A1 | 5/2021 |

OTHER PUBLICATIONS

Extended European Search Report for European Application No. 22214967.6 dated May 26, 2023, 10 pages.

Extended European Search Report for European Application No. 22214988.2 dated Jun. 1, 2023, 12 pages.

Hong et al., "Data-Driven Approach for Automatically Correcting Faulty Road Maps", arXiv:2211.06544v1, (Nov. 12, 2022), 9 pages.

Johnson et al., "Perceptual Losses for Real-Time Style Transfer and Super-Resolution", 16th European Conference, Computer Vision—ECCV 2020, (Sep. 17, 2016), 18 pages.

Jolicoeur-Martineau, "The Relativistic Discriminator: A Key Element Missing from Standard GAN", arXiv:1807.00734v1, (Jul. 2, 2018), 24 pages.

Shorten et al., "A Survey on Image Data Augmentation for Deep Learning", Journal of Big Data 6, Article No. 60, (Jul. 6, 2019), 48 pages.

Zeng et al., "Aggregated Contextual Transformations for High-Resolution Image Inpainting", arXiv:2104.01431v1, (Apr. 3, 2021), 14 pages.

Iizuka et al., "Globally and Locally Consistent Image Completion", ACM Transactions on Graphics, vol. 36, No. 4, Article 107, (Jul. 2017), 14 pages.

Lee et al., "Copy-And-Paste Networks for Deep Video Inpainting", 2019 IEEE/CVF International Conference on Computer Vision (ICCV), (Oct. 2019), 9 pages.

Non-Final Office Action for U.S. Appl. No. 17/645,096 dated Feb. 26, 2024.

Non-Final Office Action for U.S. Appl. No. 17/645,098 dated Apr. 16, 2024.

Zhang et al., "Least Squares Relativistic Generative Adversarial Network for Perceptual Super-Resolution Imaging", IEEE Access 2020, (Oct. 12, 2020), 11 pages.

\* cited by examiner

METHOD, APPARATUS, AND COMPUTER PROGRAM PRODUCT FOR CORRECTING LANE GEOMETRY IN MAP DATA

TECHNOLOGICAL FIELD

An example embodiment of the present disclosure relates to correcting lane geometry within map data, and more particularly, to using a machine learning model to predict lane geometry where incorrect or missing lane line geometry is detected.

BACKGROUND

Maps have been used for centuries for providing route geometry and geographical information. Conventional paper maps including static images of roadways and geographic features from a snapshot in history have given way to digital maps used by and presented on computers, mobile devices, vehicles, etc. These digital maps can be updated and revised such that users have the most-current maps available to them each time they view a map hosted by a mapping service server. Digital maps can further be enhanced with dynamic information, such as traffic information in real time along roads and through intersections.

As digital maps, including high-definition (HD) digital maps with rich content can span entire continents, these digital maps include vast amounts of information, which can be corrupted through missing or erroneous data such as missing or erroneous lane geometry. Incorrect lane geometry information can be problematic as such lane geometry may be used for route guidance and at least semi-autonomous vehicle control. Inaccurate lane geometries can reduce the effectiveness of route guidance and vehicle autonomy.

BRIEF SUMMARY

A method, apparatus, and computer program product are provided in accordance with an example embodiment for correcting lane geometry within map data, and more particularly, to using a machine learning model to predict lane geometry where incorrect or missing lane geometry is detected. Embodiments provided herein include an apparatus having at least one processor and at least one memory including computer program code with the at least one memory and computer program code being configured to, with the processor, cause the apparatus to: receive a representation of lane line geometry for one or more roads of a road network; identify an area within the representation including broken lane line geometry; generate a masked area of the area within the representation including the broken lane line geometry; process the representation with the masked area through an inpainting model, where the inpainting model includes a generator network, where the representation is processed through the generator network which includes dilated convolution layers for inpainting of the masked area with corrected lane line geometry in a corrected representation; and update a map database to include the corrected lane line geometry in place of the area including the broken lane line geometry based on the corrected representation.

According to some embodiments, the apparatus is further caused to process the corrected representation through a discriminator of the inpainting model, where the discriminator discerns a quality score for the corrected representation representing the accuracy of the corrected lane line geometry. Causing the apparatus of certain embodiments to update the map database to include the corrected lane line geometry in place of the area including the broken lane line geometry based on the corrected representation includes causing the apparatus to update the map database to include the corrected lane line geometry in place of the area including the broken lane line geometry based on the corrected representation in response to the quality score for the corrected representation satisfying a predetermined value. Causing the apparatus of certain embodiments to process the representation through the inpainting model further includes causing the apparatus to apply a Relativistic Least Square General Adversarial Network loss function to train the inpainting model to increase the quality score of the corrected representation.

According to some embodiments, the generator network processes the representation using eight dilated convolution layers including dilation factors from two to nine. The apparatus of certain embodiments is caused to train the inpainting model using a perceptual loss function. The perceptual loss function is based on a difference between a generated representation's feature maps of a convolutional neural network and target representation's feature maps of the convolutional neural network. Causing the apparatus of certain embodiments to identify an area within the representation including broken lane line geometry includes causing the apparatus to: process the representation of lane line geometry for one or more roads of a road network using a detection model, where the detection model identifies missing lane line geometry and incorrect lane line geometry as broken lane line geometry. The detection model of some embodiments identifies the area within the representation including the broken lane line geometry.

Embodiments provided herein include a computer program product including at least one non-transitory computer-readable storage medium having computer-executable program code instructions stored therein, the computer-executable program code instructions including program code instructions to: receive a representation of lane line geometry for one or more roads of a road network; identify an area within the representation including broken lane line geometry; generate a masked area of the area within the representation including the broken lane line geometry; process the representation with the masked area through an inpainting model, where the inpainting model includes a generator network, where the representation is processed through the generator network which includes dilated convolution layers for inpainting of the masked area with corrected lane line geometry in a corrected representation; and update a map database to include the corrected lane line geometry in place of the area including the broken lane line geometry based on the corrected representation.

According to some embodiments, the computer program product further includes program code instructions to process the corrected representation through a discriminator of the inpainting model, where the discriminator discerns a quality score for the corrected representation representing the accuracy of the corrected lane line geometry. The program code instructions of certain embodiments to update the map database to include the corrected lane line geometry in place of the area including the broken lane line geometry based on the corrected representation include program code instructions to update the map database to include the corrected lane line geometry in place of the area including the broken lane line geometry based on the corrected representation in response to the quality score for the corrected representation satisfying a predetermined value. The program code instructions of certain embodiments to process the representation through the inpainting model further include program code instructions to apply a Relativistic Least Square General Adversarial Network loss function to train the inpainting model to increase the quality score of the corrected representation.

According to some embodiments, the generator network processes the representation using eight dilated convolution layers including dilation factors from two to nine. The computer program product of certain embodiments includes program code instructions to train the inpainting model using a perceptual loss function. The perceptual loss function is based on a difference between a generated representation's feature maps of a convolutional neural network and target representation's feature maps of the convolutional neural network. The program code instructions of certain embodiments to identify an area within the representation including broken lane line geometry include program code instructions to: process the representation of lane line geometry for one or more roads of a road network using a detection model, where the detection model identifies missing lane line geometry and incorrect lane line geometry as broken lane line geometry. The detection model of some embodiments identifies the area within the representation including the broken lane line geometry.

Embodiments provided herein include a method including: receiving a representation of lane line geometry for one or more roads of a road network; identifying an area within the representation including broken lane line geometry; generating a masked area of the area within the representation including the broken lane line geometry; processing the representation with the masked area through an inpainting model, where the inpainting model includes a generator network, where the representation is processed through the generator network which includes dilated convolution layers for inpainting of the masked area with corrected lane line geometry in a corrected representation; and updating a map database to include the corrected lane line geometry in place of the area including the broken lane line geometry based on the corrected representation.

According to some embodiments, the method further includes processing the corrected representation through a discriminator of the inpainting model, where the discriminator discerns a quality score for the corrected representation representing the accuracy of the corrected lane line geometry. According to some embodiments, updating the map database to include the corrected lane line geometry in place of the area including the broken lane line geometry based on the corrected representation includes updating the map database to include the corrected lane line geometry in place of the area including the broken lane line geometry based on the corrected representation in response to the quality score for the corrected representation satisfying a predetermined value. According to some embodiments, processing the representation through the inpainting model further includes applying a Relativistic Least Square General Adversarial Network loss function to train the inpainting model to increase the quality score of the corrected representation.

According to some embodiments, the generator network processes the representation using eight dilated convolution layers including dilation factors from two to nine. The method of certain embodiments includes training the inpainting model using a perceptual loss function. The perceptual loss function is based on a difference between a generated representation's feature maps of a convolutional neural network and target representation's feature maps of the convolutional neural network. According to some embodiments, identifying an area within the representation including broken lane line geometry includes processing the representation of lane line geometry for one or more roads of a road network using a detection model, where the detection model identifies missing lane line geometry and incorrect lane line geometry as broken lane line geometry. The detection model of some embodiments identifies the area within the representation including the broken lane line geometry.

Embodiments provided herein include an apparatus including: means for receiving a representation of lane line geometry for one or more roads of a road network; means for identifying an area within the representation including broken lane line geometry; means for generating a masked area of the area within the representation including the broken lane line geometry; means for processing the representation with the masked area through an inpainting model, where the inpainting model includes a generator network, where the representation is processed through the generator network which includes dilated convolution layers for inpainting of the masked area with corrected lane line geometry in a corrected representation; and means for updating a map database to include the corrected lane line geometry in place of the area including the broken lane line geometry based on the corrected representation.

According to some embodiments, the apparatus further includes means for processing the corrected representation through a discriminator of the inpainting model, where the discriminator discerns a quality score for the corrected representation representing the accuracy of the corrected lane line geometry. According to some embodiments, the means for updating the map database to include the corrected lane line geometry in place of the area including the broken lane line geometry based on the corrected representation includes means for updating the map database to include the corrected lane line geometry in place of the area including the broken lane line geometry based on the corrected representation in response to the quality score for the corrected representation satisfying a predetermined value. According to some embodiments, the means for processing the representation through the inpainting model further includes means for applying a Relativistic Least Square General Adversarial Network loss function to train the inpainting model to increase the quality score of the corrected representation.

According to some embodiments, the generator network processes the representation using eight dilated convolution layers including dilation factors from two to nine. The apparatus of certain embodiments includes means for training the inpainting model using a perceptual loss function. The perceptual loss function is based on a difference between a generated representation's feature maps of a convolutional neural network and target representation's feature maps of the convolutional neural network. According to some embodiments, the means for identifying an area within the representation including broken lane line geometry includes means for processing the representation of lane line geometry for one or more roads of a road network using a detection model, where the detection model identifies missing lane line geometry and incorrect lane line geometry as broken lane line geometry. The detection model of some embodiments identifies the area within the representation including the broken lane line geometry.

Embodiments provided herein include an apparatus having at least one processor and at least one memory including computer program code with the at least one memory and computer program code being configured to, with the processor, cause the apparatus to: receive a representation of lane line geometry including a masked area representing an area of broken lane line geometry; process the representation using an inpainting model including a generator to produce a corrected representation, where the masked area is inpainted to correct the broken lane line geometry, where the generator processes the representation through one or more convolution layers and at least eight dilated convolution layers having dilation factors from two to nine to generate inpainting of corrected lane line geometry in the corrected representation; process the corrected representation through a discriminator of the inpainting model, where the discriminator discerns a score reflecting a quality measure of the corrected representations; and update a map database based on the corrected representation in response to the score satisfying a predetermined threshold.

According to some embodiments, causing the apparatus to process the corrected representation through the discriminator includes causing the apparatus to: process an inpainted masked area of the corrected representation through a first discriminator; and process the corrected representation through a second discriminator. The apparatus of certain embodiments is further caused to combine a result from the first discriminator with a result from the second discriminator to generate the score reflecting the quality measure of the corrected representation. The inpainting model of an example embodiment that includes the generator is trained using a perceptual loss function. The inpainting model of an example embodiment that includes the discriminator is trained using a Relativistic Least Square Generative Adversarial Network loss function.

The generator of an example embodiment is trained using training representations of lane line geometry. Causing the apparatus of certain embodiments to update a map database based on the corrected representation in response to the score satisfying a predetermine value includes causing the apparatus to update lane line geometry of the map database with the lane line geometry of the corrected representation. The map database including updated lane line geometry is used, in some embodiments, for at least one of navigational assistance or at least partially autonomous vehicle control through road segments associated with the updated lane line geometry.

Embodiments provided herein include a computer program product including at least one non-transitory computer-readable storage medium having computer-executable program code instructions stored therein, the computer-executable program code instructions including program code instructions to: receive a representation of lane line geometry including a masked area representing an area of broken lane line geometry; process the representation using an inpainting model including a generator to produce a corrected representation, where the masked area is inpainted to correct the broken lane line geometry, where the generator processes the representation through one or more convolution layers and at least eight dilated convolution layers having dilation factors from two to nine to generate inpainting of corrected lane line geometry in the corrected representation; process the corrected representation through a discriminator of the inpainting model, where the discriminator discerns a score reflecting a quality measure of the corrected representations; and update a map database based on the corrected representation in response to the score satisfying a predetermined threshold. A computer program product may be provided. For example, a computer program product including instructions which, when the program is executed by a computer, cause the computer to carry out the operations described herein.

According to some embodiments, the program code instructions to process the corrected representation through the discriminator includes causing the apparatus to: process an inpainted masked area of the corrected representation through a first discriminator; and process the corrected representation through a second discriminator. The computer program product of certain embodiments further includes program code instructions to combine a result from the first discriminator with a result from the second discriminator to generate the score reflecting the quality measure of the corrected representation. The inpainting model of an example embodiment that includes the generator trains the inpainting model using a perceptual loss function. The inpainting model of an example embodiment that includes the is trained using a Relativistic Least Square Generative Adversarial Network loss function.

The generator of an example embodiment is trained using training representations of lane line geometry. The program code instructions to update a map database based on the corrected representation in response to the score satisfying a predetermined value include, in some embodiments, program code instructions to update lane line geometry of the map database with the lane line geometry of the corrected representation. The map database including updated lane line geometry is used, in some embodiments, for at least one of navigational assistance or at least partially autonomous vehicle control through road segments associated with the updated lane line geometry.

Embodiments provided herein include a method including: receiving a representation of lane line geometry including a masked area representing an area of broken lane line geometry; processing the representation using an inpainting model including a generator to produce a corrected representation, where the masked area is inpainted to correct the broken lane line geometry, where the generator processes the representation through one or more convolution layers and at least eight dilated convolution layers having dilation factors from two to nine to generate inpainting of corrected lane line geometry in the corrected representation; processing the corrected representation through a discriminator of the inpainting model, where the discriminator discerns a score reflecting a quality measure of the corrected representations; and updating a map database based on the corrected representation in response to the score satisfying a predetermined threshold.

According to some embodiments, processing the corrected representation through the discriminator includes processing an inpainted masked area of the corrected representation through a first discriminator; and processing the corrected representation through a second discriminator. The method of certain embodiments further includes combining a result from the first discriminator with a result from the second discriminator to generate the score reflecting the quality measure of the corrected representation. The inpainting model of an example embodiment that includes the generator is trained using a perceptual loss function. The inpainting model of an example embodiment that includes the discriminator is trained using a Relativistic Least Square Generative Adversarial Network loss function.

The generator of an example embodiment is trained using training representations of lane line geometry. Updating a map database based on the corrected representation in response to the score satisfying a predetermined value includes, in some embodiments, updating lane line geometry of the map database with the lane line geometry of the corrected representation. The map database including updated lane line geometry is used, in some embodiments, for at least one of navigational assistance or at least partially autonomous vehicle control through road segments associated with the updated lane line geometry.

Embodiments provided herein include an apparatus including: means for receiving a representation of lane line geometry including a masked area representing an area of broken lane line geometry; means for processing the representation using an inpainting model including a generator to produce a corrected representation, where the masked area is inpainted to correct the broken lane line geometry, where the generator processes the representation through one or more convolution layers and at least eight dilated convolution layers having dilation factors from two to nine to generate inpainting of corrected lane line geometry in the corrected representation; means for processing the corrected representation through a discriminator of the inpainting model, where the discriminator discerns a score reflecting a quality measure of the corrected representations; and means for updating a map database based on the corrected representation in response to the score satisfying a predetermined threshold.

According to some embodiments, the means for processing the corrected representation through the discriminator includes means for processing an inpainted masked area of the corrected representation through a first discriminator; and means for processing the corrected representation through a second discriminator. The apparatus of certain embodiments further includes means for combining a result from the first discriminator with a result from the second discriminator to generate the score reflecting the quality measure of the corrected representation. The inpainting model of an example embodiment that includes the generator is trained using a perceptual loss function. The inpainting model of an example embodiment that includes the discriminator is trained using a Relativistic Least Square Generative Adversarial Network loss function.

The generator of an example embodiment is trained using training representations of lane line geometry. The means for updating a map database based on the corrected representation in response to the score satisfying a predetermined value includes, in some embodiments, means for updating lane line geometry of the map database with the lane line geometry of the corrected representation. The map database including updated lane line geometry is used, in some embodiments, for at least one of navigational assistance or at least partially autonomous vehicle control through road segments associated with the updated lane line geometry.

Embodiments described herein provide an apparatus including at least one processor and at least one memory including computer program code, the at least one memory and computer program code configured to, with the processor, cause the apparatus to: receive a representation of lane line geometry for one or more roads of a road network; identify an area within the representation as broken lane line geometry of an intersection using a machine learning model trained to detect road geometry intersections; generate a masked area of the broken lane line geometry of the intersection within the representation; process the representation with the masked area using an inpainting model to generate an inpainted result within the masked area of restored lane line geometry of the intersection, where the inpainting model is trained using a set of representations identified as lane line geometry of intersections; and update a map database to include the restored lane line geometry of the intersection in place of the broken lane line geometry of the intersection.

According to an example embodiment, the set of representations includes representations identified as lane line geometry of different types of intersections labeled according to their respective type of intersection. The different types of intersection of an example embodiment are established based, at least in part, on a number of road segments intersecting and a number of lanes within road segments intersecting. The inpainting model of an example embodiment includes a generator network, where the representation with the masked area is produced through the generator network which includes dilated convolution layers for generating the inpainted result within the masked area of the restored lane line geometry of the intersection. The generator network of an example embodiment processes the representation using eight dilated convolution layers including dilation factors from two to nine.

The apparatus of certain embodiments is further caused to process the representation with the inpainted result within the masked area of the restored lane line geometry of the intersection through a discriminator of the inpainting model, where the discriminator discerns a quality score for the inpainted result representing the accuracy of the restored lane line geometry of the intersection. Causing the apparatus of an example embodiment to update the map database to include the restored lane line geometry of the intersection in place of the broken lane line geometry of the intersection includes causing the apparatus to update the map database to include the restored lane line geometry in response to the quality score of for the inpainted result satisfying a predetermined value. The set of representations identified as lane line geometry of intersections includes, in some embodiments, a set of representations including a plurality of representations generated from a first representation, where the plurality of representations are generated from the first representation through one or more of: rotation of the first representation, translation of the first representation, or inversion of the first representation.

Embodiments provided herein include a computer program product including at least one non-transitory computer-readable storage medium having computer-executable program code instructions stored therein, the computer-executable program code instructions including program code instructions to: receive a representation of lane line geometry for one or more roads of a road network; identify an area within the representation as broken lane line geometry of an intersection using a machine learning model trained to detect road geometry intersections; generate a masked area of the broken lane line geometry of the intersection within the representation; process the representation with the masked area using an inpainting model to generate an inpainted result within the masked area of restored lane line geometry of the intersection, where the inpainting model is trained using a set of representations identified as lane line geometry of intersections; and update a map database to include the restored lane line geometry of the intersection in place of the broken lane line geometry of the intersection.

According to an example embodiment, the set of representations includes representations identified as lane line geometry of different types of intersections labeled according to their respective type of intersection. The different types of intersection of an example embodiment are established based, at least in part, on a number of road segments intersecting and a number of lanes within road segments intersecting. The inpainting model of an example embodiment includes a generator network, where the representation with the masked area is produced through the generator network which includes dilated convolution layers for generating the inpainted result within the masked area of the restored lane line geometry of the intersection. The generator network of an example embodiment processes the representation using eight dilated convolution layers including dilation factors from two to nine.

The computer program product of certain embodiments further includes program code instructions to process the representation with the inpainted result within the masked area of the restored lane line geometry of the intersection through a discriminator of the inpainting model, where the discriminator discerns a quality score for the inpainted result representing the accuracy of the restored lane line geometry of the intersection. The program code instructions to update the map database to include the restored lane line geometry of the intersection in place of the broken lane line geometry of the intersection includes, in some embodiments, program code instructions to update the map database to include the restored lane line geometry in response to the quality score of for the inpainted result satisfying a predetermined value. The set of representations identified as lane line geometry of intersections includes, in some embodiments, a set of representations including a plurality of representations generated from a first representation, where the plurality of representations are generated from the first representation through one or more of: rotation of the first representation, translation of the first representation, or inversion of the first representation.

Embodiments provided herein include a method including: receiving a representation of lane line geometry for one or more roads of a road network; identifying an area within the representation as broken lane line geometry of an intersection using a machine learning model trained to detect road geometry intersections; generating a masked area of the broken lane line geometry of the intersection within the representation; processing the representation with the masked area using an inpainting model to generate an inpainted result within the masked area of restored lane line geometry of the intersection, where the inpainting model is trained using a set of representations identified as lane line geometry of intersections; and updating a map database to include the restored lane line geometry of the intersection in place of the broken lane line geometry of the intersection.

According to an example embodiment, the set of representations includes representations identified as lane line geometry of different types of intersections labeled according to their respective type of intersection. The different types of intersection of an example embodiment are established based, at least in part, on a number of road segments intersecting and a number of lanes within road segments intersecting. The inpainting model of an example embodiment includes a generator network, where the representation with the masked area is produced through the generator network which includes dilated convolution layers for generating the inpainted result within the masked area of the restored lane line geometry of the intersection. The generator network of an example embodiment processes the representation using eight dilated convolution layers including dilation factors from two to nine.

The method of certain embodiments further includes processing the representation with the inpainted result within the masked area of the restored lane line geometry of the intersection through a discriminator of the inpainting model, where the discriminator discerns a quality score for the inpainted result representing the accuracy of the restored lane line geometry of the intersection. Updating the map database to include the restored lane line geometry of the intersection in place of the broken lane line geometry of the intersection includes, in some embodiments, updating the map database to include the restored lane line geometry in response to the quality score of for the inpainted result satisfying a predetermined value. The set of representations identified as lane line geometry of intersections includes, in some embodiments, a set of representations including a plurality of representations generated from a first representation, where the plurality of representations is generated from the first representation through one or more of: rotation of the first representation, translation of the first representation, or inversion of the first representation.

Embodiments provided herein include an apparatus including: means for receiving a representation of lane line geometry for one or more roads of a road network; means for identifying an area within the representation as broken lane line geometry of an intersection using a machine learning model trained to detect road geometry intersections; means for generating a masked area of the broken lane line geometry of the intersection within the representation; means for processing the representation with the masked area using an inpainting model to generate an inpainted result within the masked area of restored lane line geometry of the intersection, where the inpainting model is trained using a set of representations identified as lane line geometry of intersections; and means for updating a map database to include the restored lane line geometry of the intersection in place of the broken lane line geometry of the intersection.

According to an example embodiment, the set of representations includes representations identified as lane line geometry of different types of intersections labeled according to their respective type of intersection. The different types of intersection of an example embodiment are established based, at least in part, on a number of road segments intersecting and a number of lanes within road segments intersecting. The inpainting model of an example embodiment includes a generator network, where the representation with the masked area is produced through the generator network which includes dilated convolution layers for generating the inpainted result within the masked area of the restored lane line geometry of the intersection. The generator network of an example embodiment processes the representation using eight dilated convolution layers including dilation factors from two to nine.

The apparatus of certain embodiments further includes means for processing the representation with the inpainted result within the masked area of the restored lane line geometry of the intersection through a discriminator of the inpainting model, where the discriminator discerns a quality score for the inpainted result representing the accuracy of the restored lane line geometry of the intersection. The means for updating the map database to include the restored lane line geometry of the intersection in place of the broken lane line geometry of the intersection includes, in some embodiments, means for updating the map database to include the restored lane line geometry in response to the quality score of for the inpainted result satisfying a predetermined value. The set of representations identified as lane line geometry of intersections includes, in some embodiments, a set of representations including a plurality of representations generated from a first representation, where the plurality of representations is generated from the first representation through one or more of: rotation of the first representation, translation of the first representation, or inversion of the first representation.

BRIEF DESCRIPTION OF THE DRAWINGS

Figure 1:
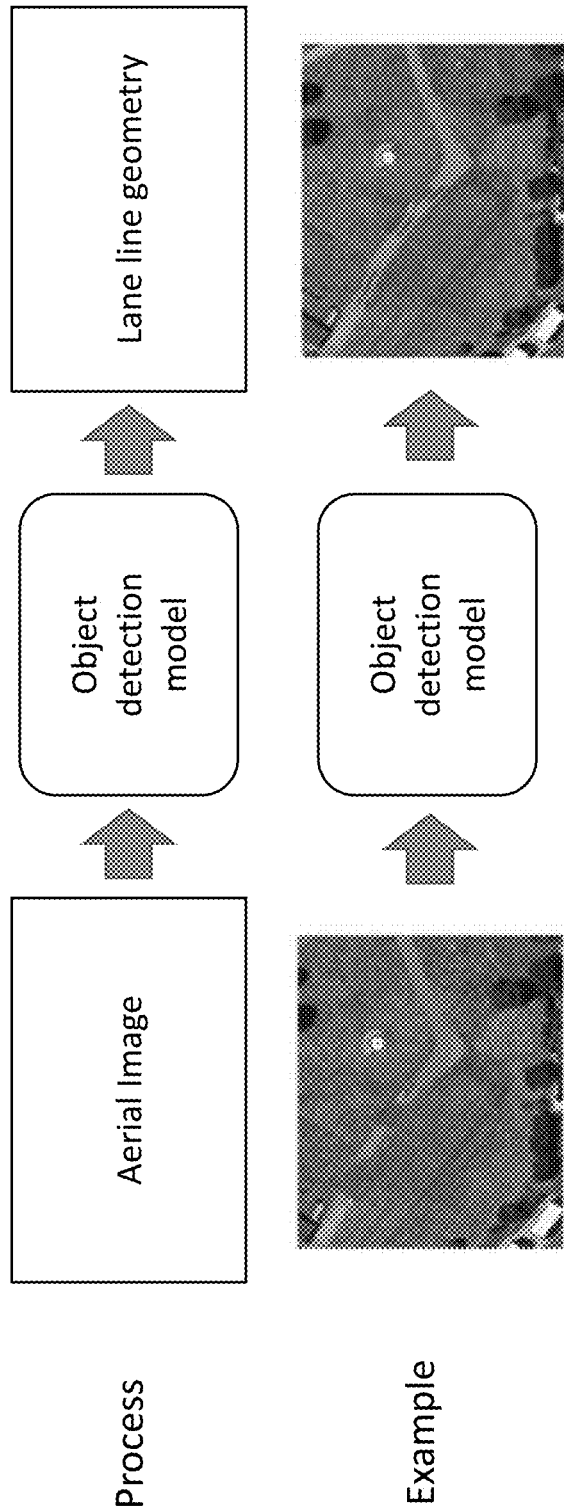
Figure 2:
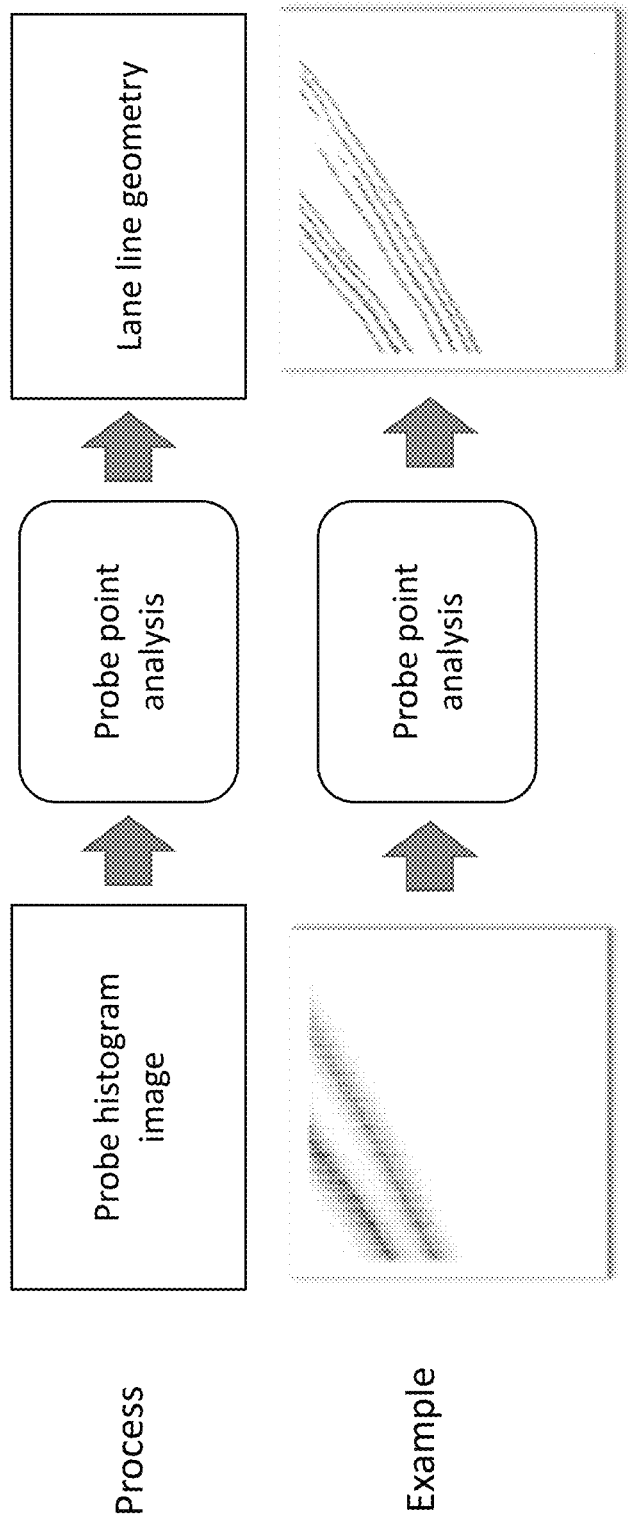
Figure 3:
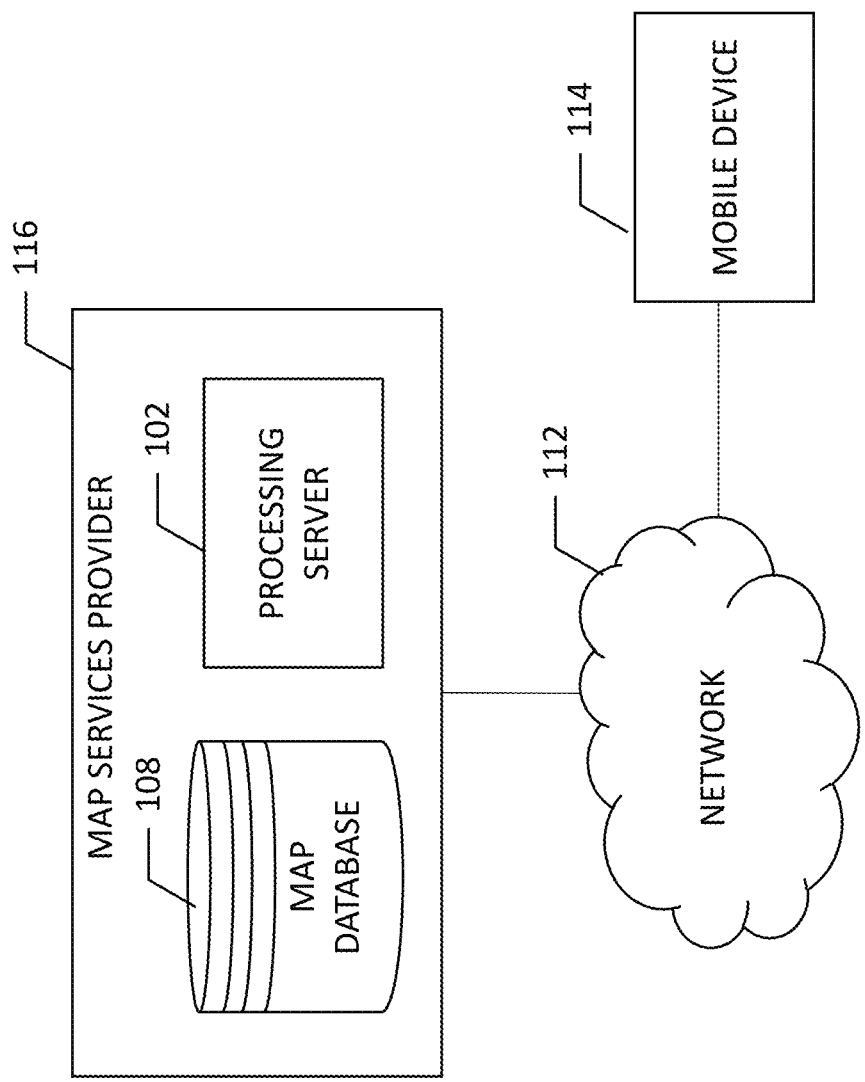
Figure 4:
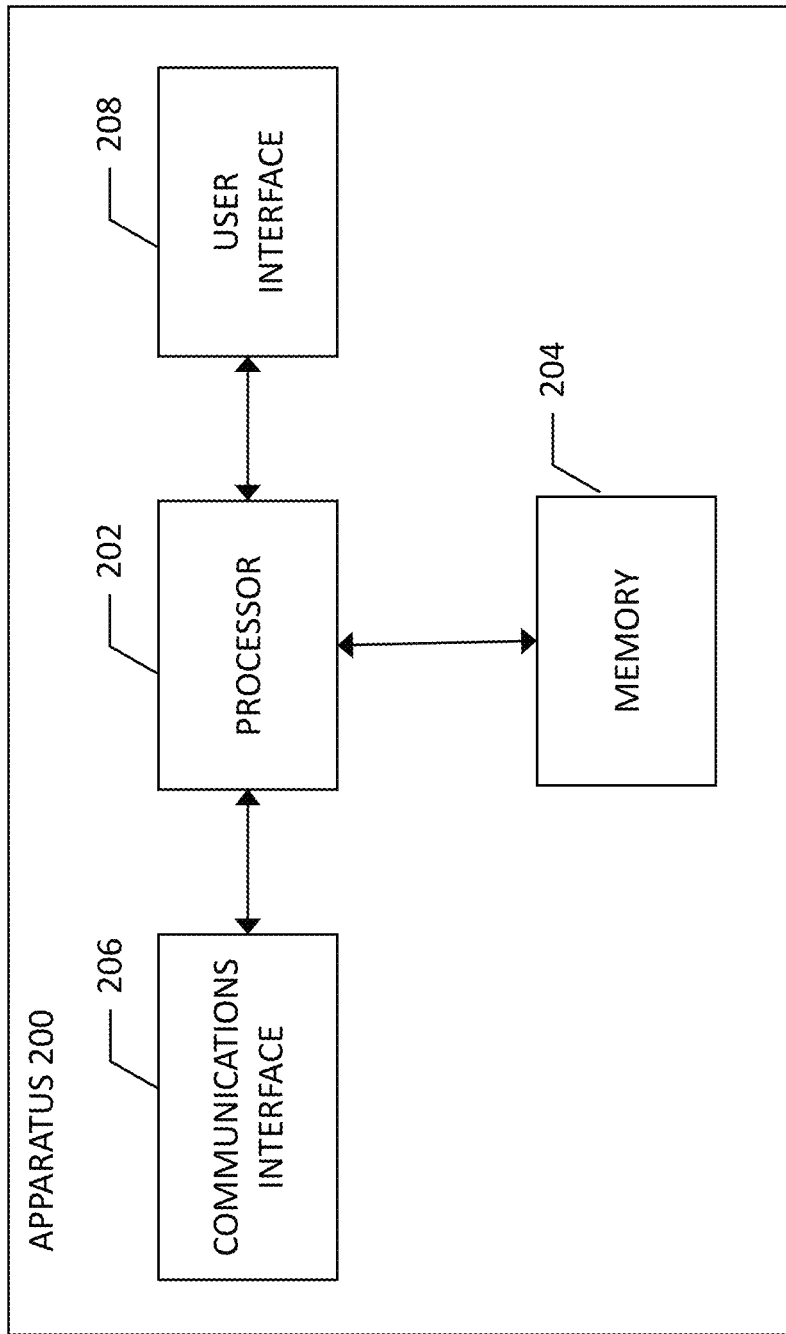
Figure 5:
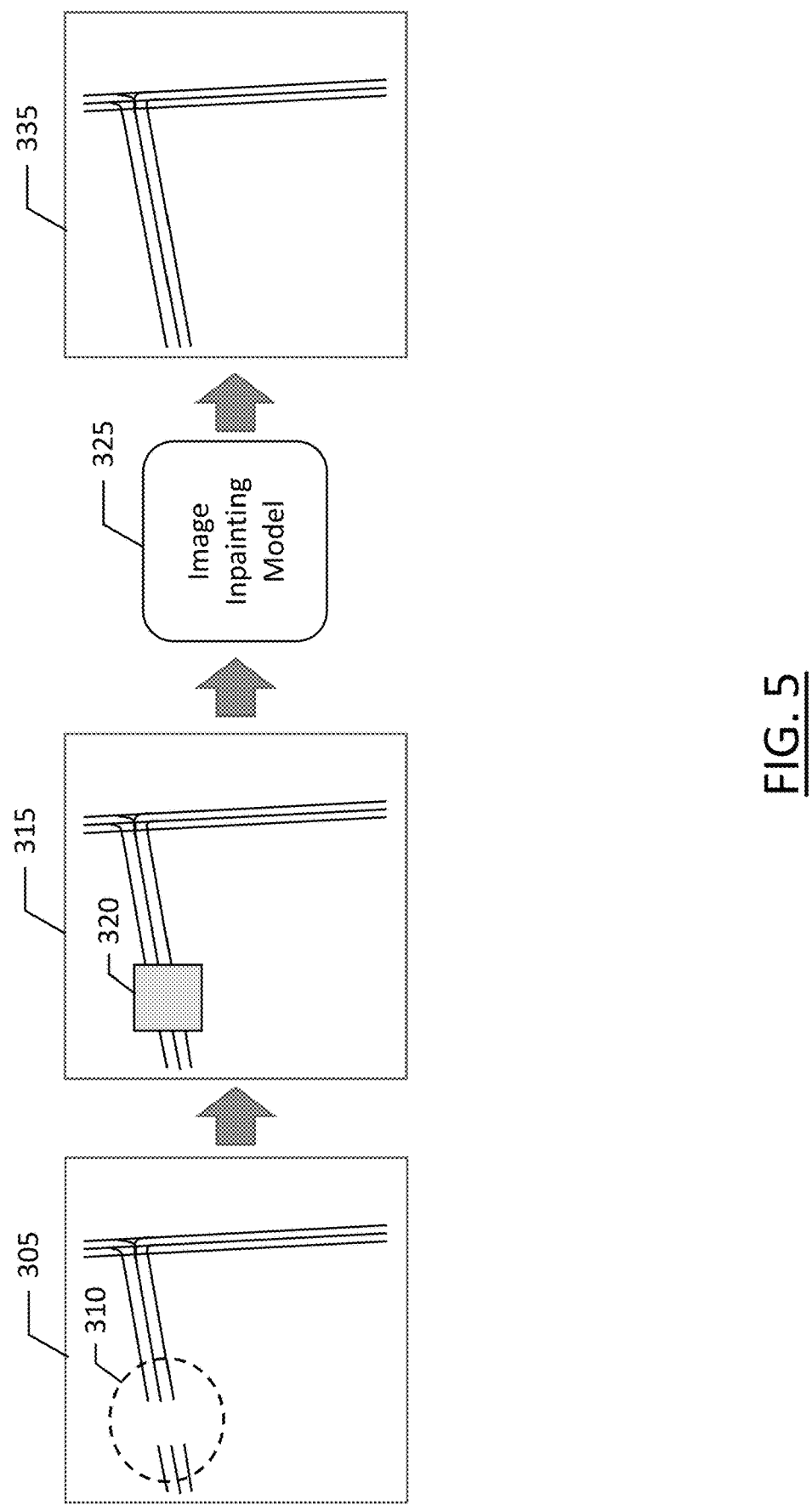
Figure 6:
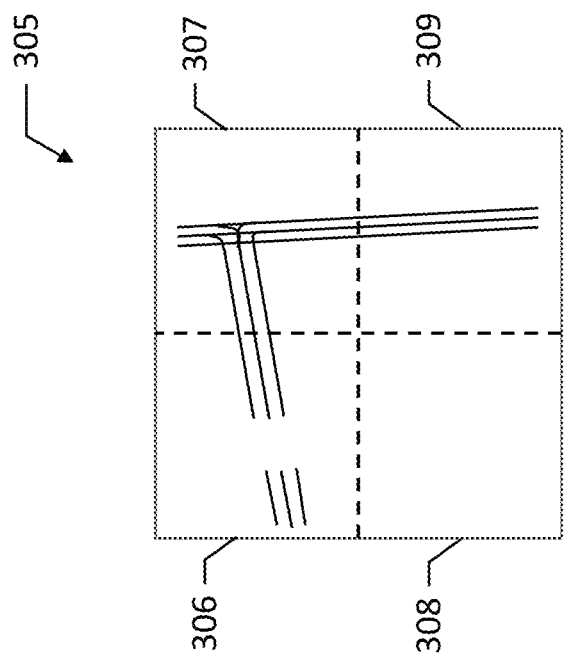
Figure 7:
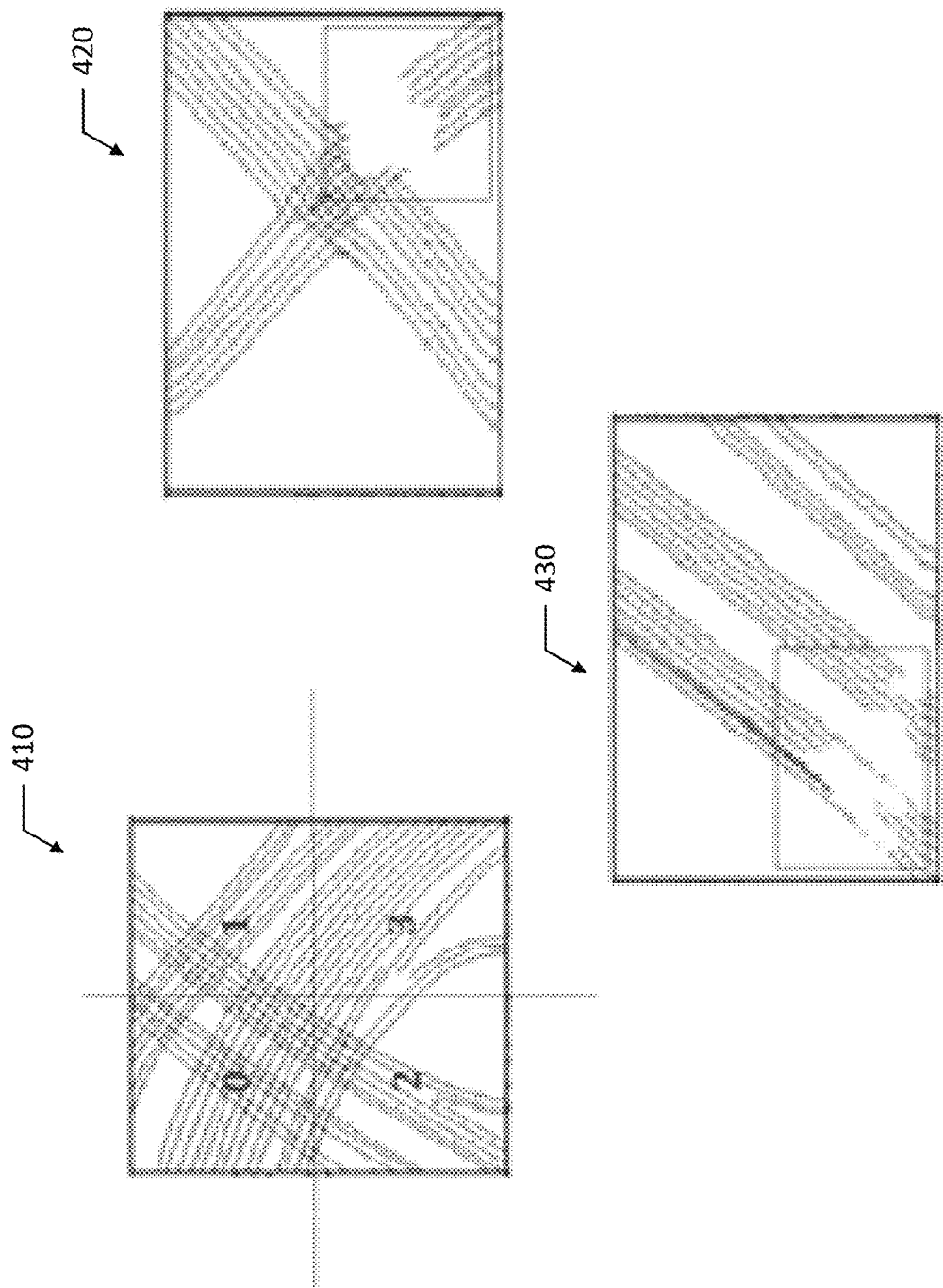
Figure 8:
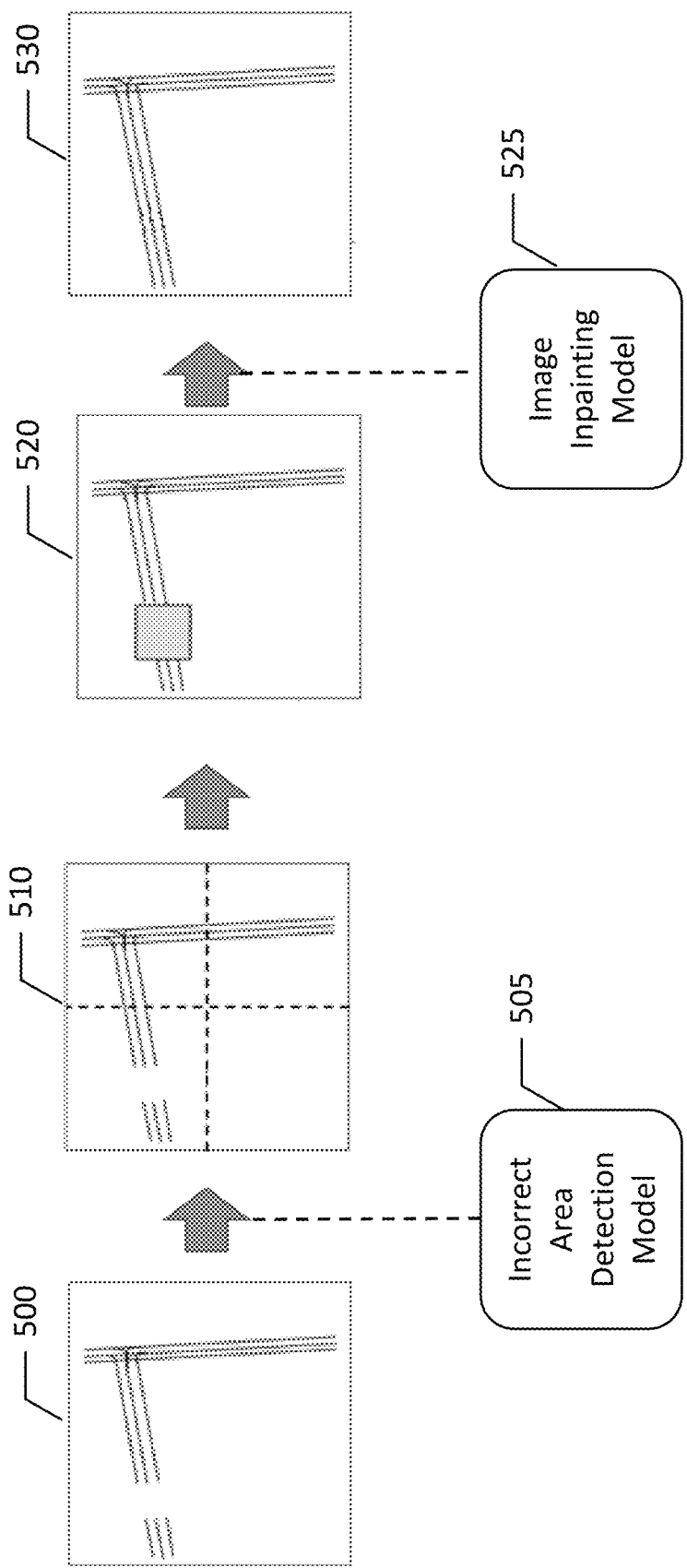
Figure 9:
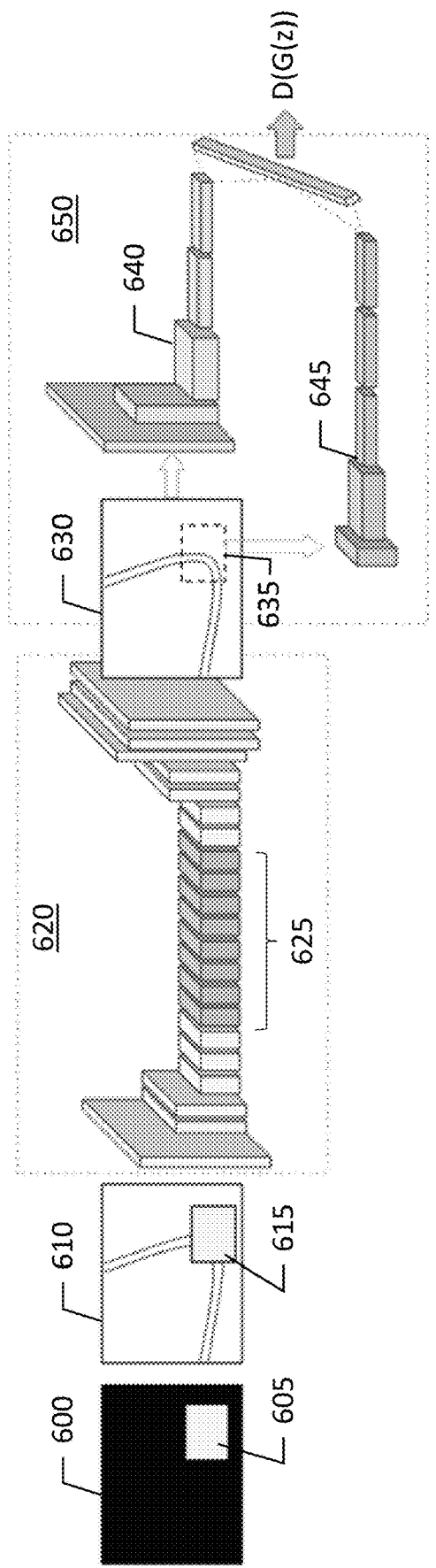
Figure 10:
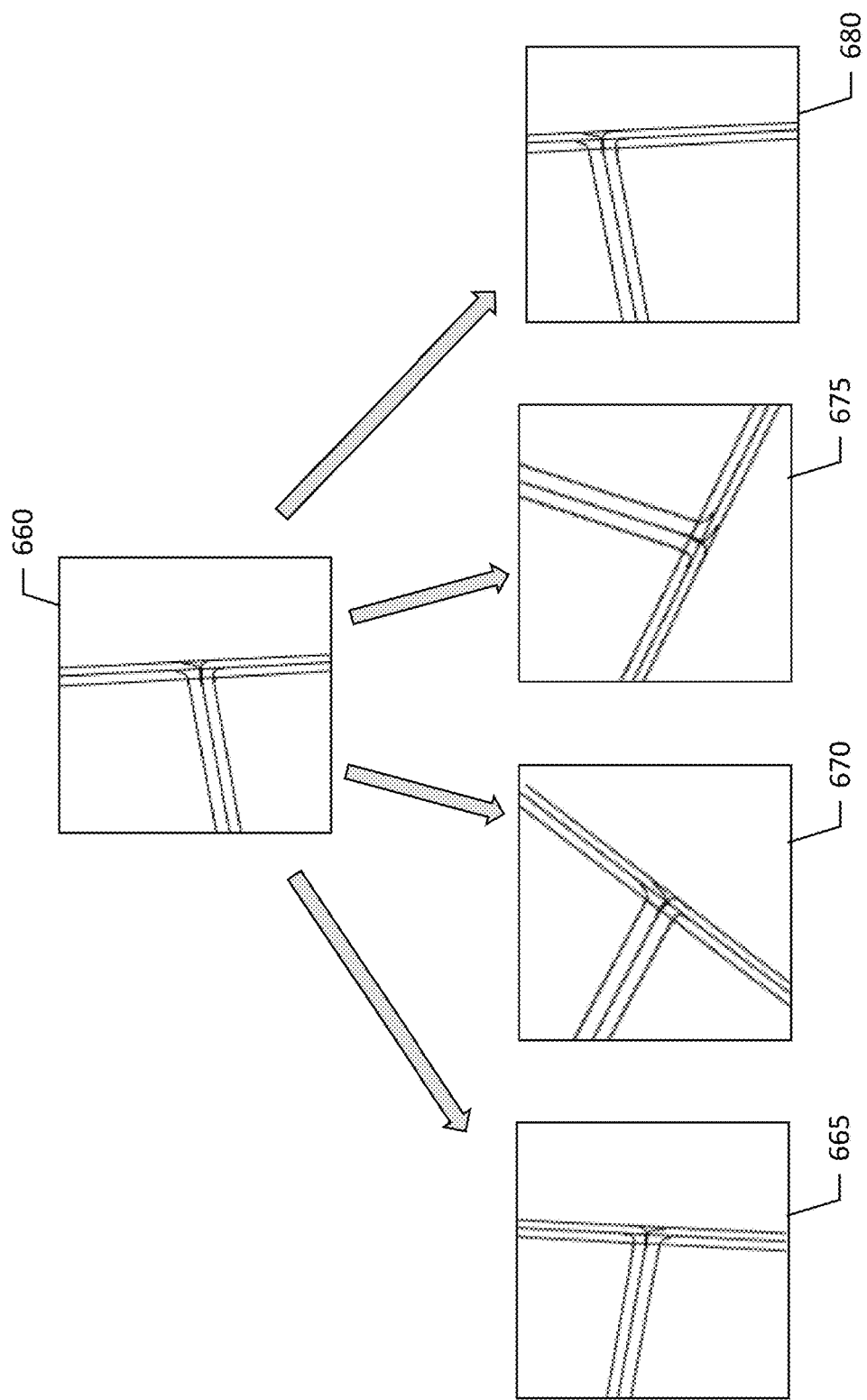
Figure 11:
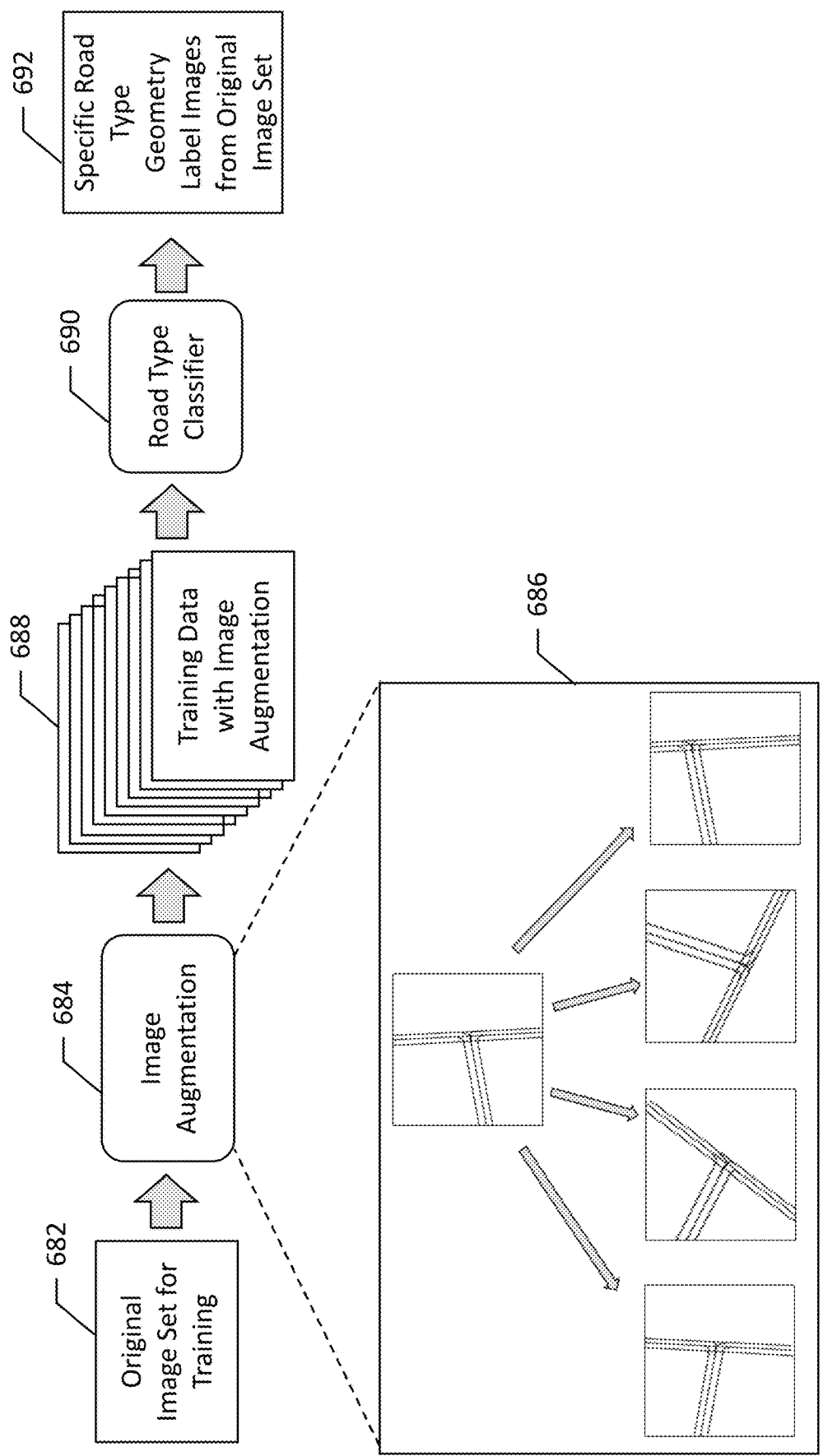
Figure 12:
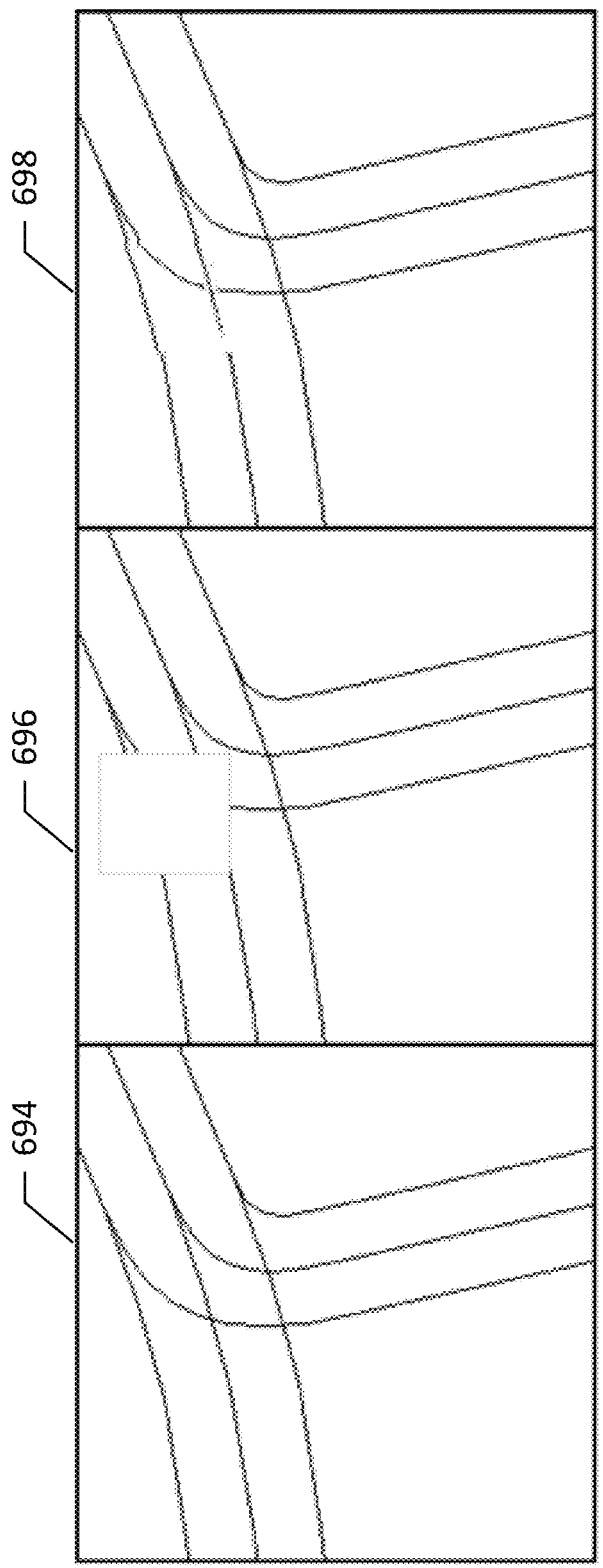
Figure 13:
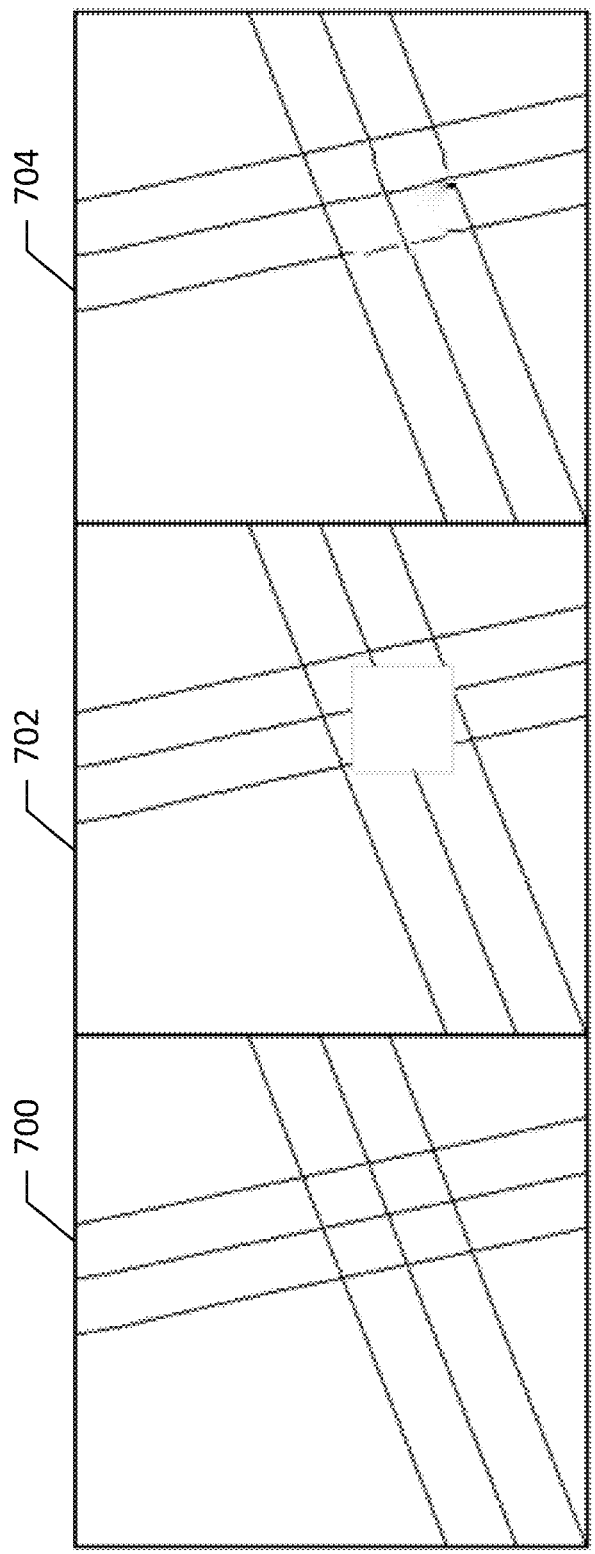
Figure 14:
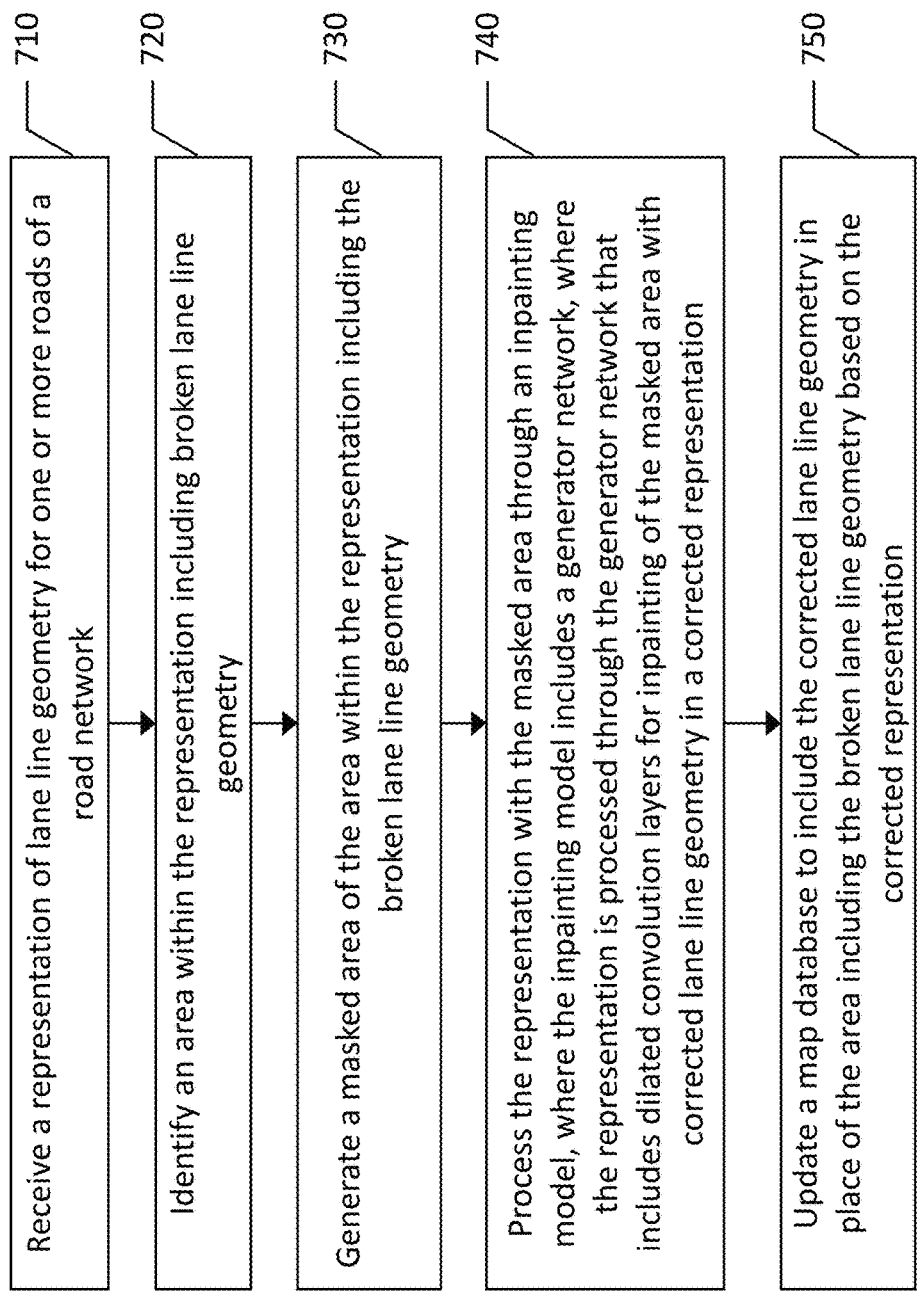
Figure 15:
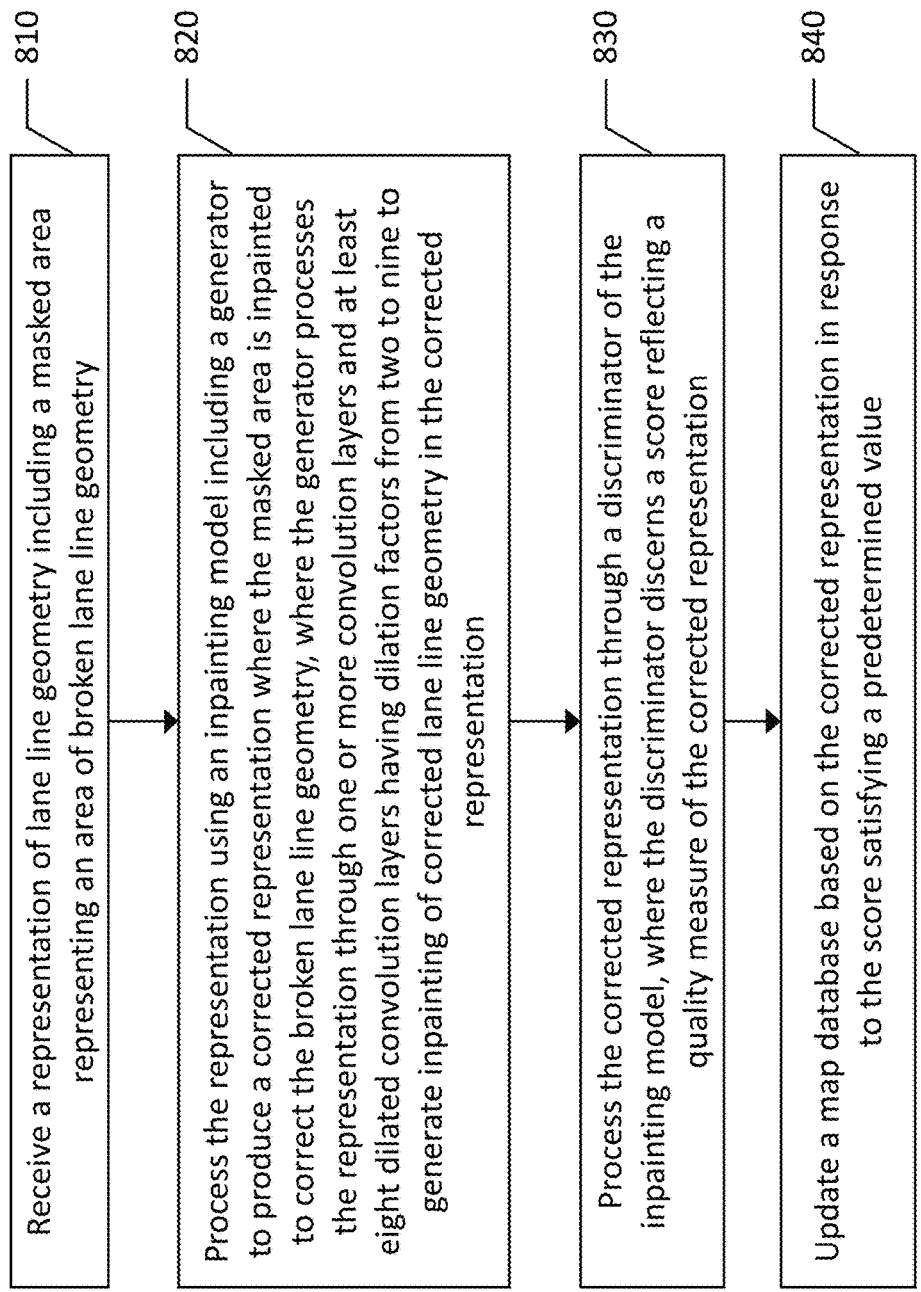
Figure 16:
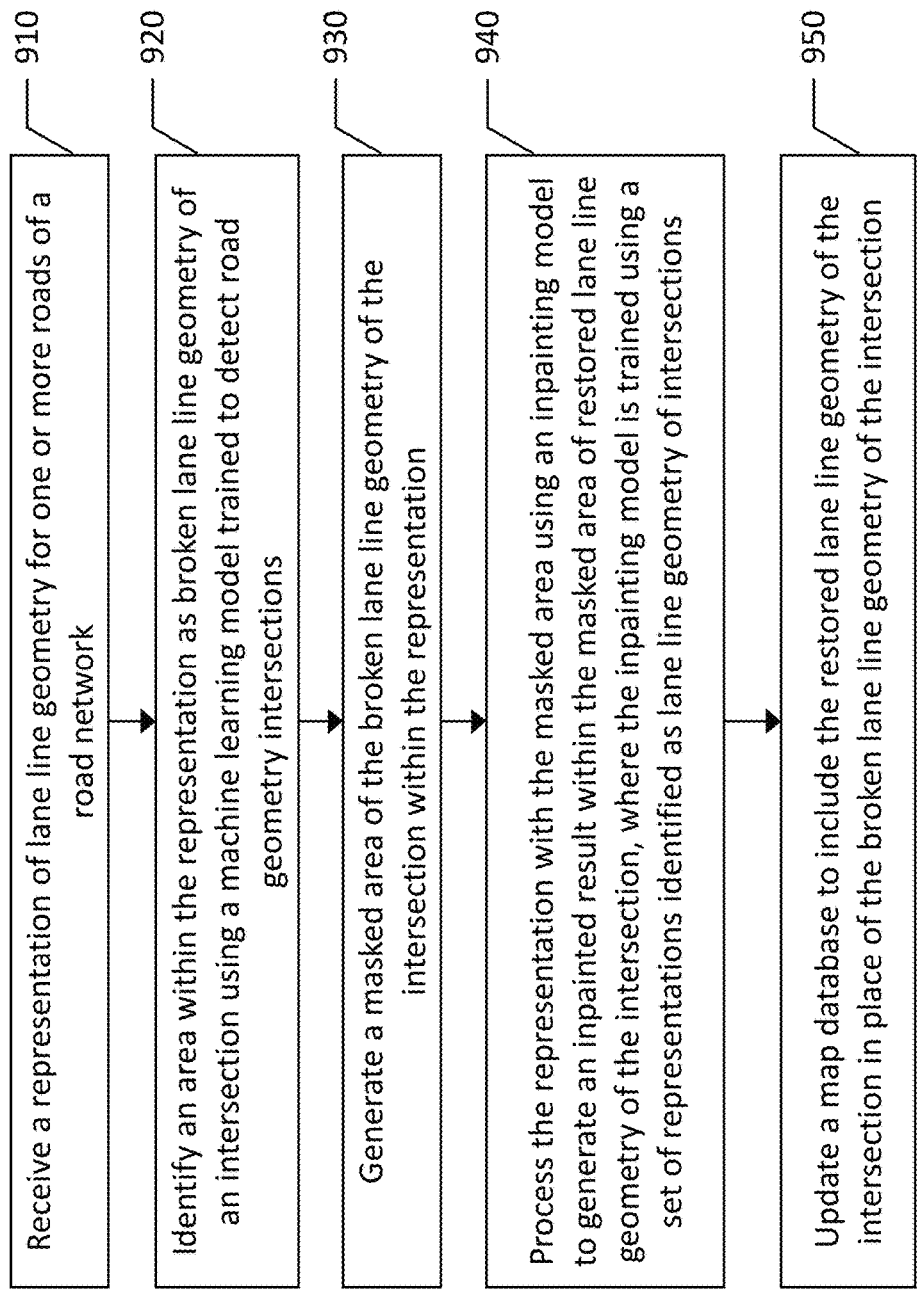

Having thus described example embodiments of the disclosure in general terms, reference will now be made to the accompanying drawings, which are not necessarily drawn to scale, and wherein:

FIG. 1 illustrates lane line geometry detection from aerial images according to an example embodiment of the present disclosure;

FIG. 2 illustrates lane line geometry detection from probe histogram images captured from probe vehicles traveling within a road network according to an example embodiment of the present disclosure;

FIG. 3 illustrates a communication diagram of a system for implementing example embodiments described herein according to an example embodiment of the present disclosure;

FIG. 4 is a block diagram of an apparatus for correcting lane geometry within map data according to an example embodiment of the present disclosure;

FIG. 5 illustrates an image inpainting technique using machine learning model to correct the wrong or missing lane geometry lines according to an example embodiment of the present disclosure;

FIG. 6 illustrates a representation of lane line geometry including broken lane lines divided into sub-areas according to an example embodiment of the present disclosure;

FIG. 7 illustrates three example representations that can be used as training data for the detection model according to an example embodiment of the present disclosure;

FIG. 8 illustrates receiving an input representation having an area of incorrect lane line geometry that is corrected using an image inpainting model according to an example embodiment of the present disclosure;

FIG. 9 illustrates an image inpainting model architecture for lane line geometry correction according to an example embodiment of the present disclosure;

FIG. 10 illustrates an example embodiment of representation augmentation according to an example embodiment of the present disclosure;

FIG. 11 illustrates the implementation of augmented representations as training data for a road type classifier according to an example embodiment of the present disclosure;

FIG. 12 illustrates lane line geometry inpainting of turn maneuvers of an intersection according to an example embodiment of the present disclosure;

FIG. 13 illustrates lane line geometry inpainting of an underpass/overpass according to an example embodiment of the present disclosure;

FIG. 14 is a flowchart of a method for using a machine learning model to predict lane geometry where incorrect or missing lane line geometry is detected according to an example embodiment of the present disclosure;

FIG. 15 is a flowchart of another method of using a machine learning model to predict lane geometry where incorrect or missing lane line geometry is detected according to an example embodiment of the present disclosure; and FIG. 16 is a flowchart of another method of using a machine learning model to predict lane geometry where incorrect or missing lane line geometry is detected according to an example embodiment of the present disclosure.

DETAILED DESCRIPTION

Example embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A system, method, apparatus, and computer program product are provided herein in accordance with an example embodiment for correcting lane geometry within map data, and more particularly, to using a machine learning model to predict lane geometry where incorrect or missing lane geometry is detected. Lane line geometry is often generated through automated means; however, the available methods can introduce errors in lane line geometry through improper detection of lane line elements in an environment. Because millions of miles of roads exist, the determination of lane line geometry errors can be a tedious process, and interpolation methods of restoring lane line geometry are not reliable given the wide array of shapes and intersection types that exist throughout road networks. Embodiments described herein provide a reliable manner of detecting broken lane line geometry and uses a machine learning model trained on different lane line geometries to automatically inpaint corrected lane line geometry where necessary. Broken lane line geometry, as described herein, includes missing, incorrect, hidden, or incomplete lane lines, missing, incomplete, hidden, or incorrect turn maneuvers, or other elements of roadway geometry that define the path of a road and lanes thereof, and vehicle paths through those lanes. This automated process reliably and efficiently restores lane line geometry such that lane line geometry is more reliable and can be more readily used for navigational assistance and for autonomous vehicle control. Restoration of lane line geometry includes repairing, recovering, generating, or otherwise creating lane line geometry in areas where broken lane line geometry exists.

Lane geometry lines such as lane boundary lines can be detected by various methods. One approach to determine lane geometry lines includes the use of images captured from aerial vehicles or satellites, where computer vision-based machine learning models identify road lane boundary lines within those images. These images, whether captured by satellite or aircraft (e.g., drones, planes, etc.) are herein collectively referred to as aerial images. Convolutional neural network-based object detection models detect lane geometry lines from aerial images as target objects. FIG. 1 illustrates an example embodiment of lane line geometry detection from aerial images. As shown, the process uses an aerial image as input to an object detection model from which lane line geometry is determined and modeled.

When aerial images are not available, or to supplement aerial images, probe data from sensors of vehicles traveling within a road network can be used. Probe data gathered from a plurality of probes traveling within a road network can be used to produce histogram images which can be filtered and/or analyzed to discover lane geometry lines. FIG. 2 illustrates an example embodiment of lane line geometry detection from probe histogram images captured from probe vehicles traveling within a road network. The probe histogram images are used as input to a probe point analysis such as using principal component analysis (PCA), Bayesian filtering, generator model, or other suitable method to determine lane line geometry.

The process to detect lane geometry lines has challenges. Generally, not all roads and lanes can be clearly visible either in probe data or in aerial images. Common obstacles that often preclude accurate lane line modeling include shadowy areas or areas of high sunlight/shadow contrast, tunnels, roads with heavy vegetation, snow cover, leaf cover (e.g., fallen leaves), etc. Therefore, not all lane line geometry can be correctly captured by object detection models with aerial images. Probe histogram images often have sparse areas of dense probe point coverage such that lane line geometry may be incorrect or missing in some areas.

There are two general categories of incorrect lane line geometry. A first category includes lane line geometry that is identified incorrectly and is different from actual lane line geometry (e.g., ground truth). The second category includes where lane lines are incomplete or missing such that there are gaps between lane line segments or incomplete lane line geometries. These incorrect lane line geometry issues can be corrected manually; however, manual correction is time consuming, inefficient, and expensive. Embodiments described herein identify incorrect lane line geometry automatically and correct the lane line geometry automatically, thereby reducing or eliminating manual correction and improving the efficiency and cost of lane line geometry correction.

Incorrect lane line geometries are typically corrected with heuristic methods. For missing lane line geometries, interpolation methods are used to fill in missing parts. In the case of wrong lane line geometries, manual removal and drawing of lane lines with extrapolation are often used. Since the interpolation technique relies on heuristic algorithms, it may be difficult to correctly fill in the actual lane line geometry since missing parts are not always simple straight lines. Road segments are often curved to accommodate topography or property lines, such that straight line extrapolation of roads to establish lane line geometry is often erroneous. Embodiments described herein identify wrong lane line geometry and missing lane line geometry and correct the lane line geometry with high accuracy and efficiency. In particular, embodiments restore any road shapes regardless of complexity. Embodiments provided herein employ a special type of Generative Adversarial Network (GAN) to fill in or correct lane line geometries.

Digital maps such as HD maps can span entire continents and include millions of miles of lane line geometry elements. The identification of erroneous lane line geometries is a formidable task and not well-suited to manual identification and tagging. Further, correction of these errors is not a task that can be performed manually on a large scale due to the time and effort required to correct thousands of lane line geometry issues. Embodiments described herein provide an automated method of detecting and correcting lane line geometry issues within the practical application of digital map development through map building and map healing. Further, embodiments improve upon the functionality of a computer implementing a digital map through efficient map healing to ensure continuity of lane line geometries that benefit both route navigation and autonomous vehicle control.

FIG. 3 illustrates a communication diagram of an example embodiment of a system for implementing example embodiments described herein. The illustrated embodiment of FIG. 3 includes a map services provider system 116, a processing server 102 in data communication with a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and a network of a system operator. The processing server 102 may include the map database 108, such as provided by a remote map server. The network may be wired, wireless, or any combination of wired and wireless communication networks, such as cellular, Wi-Fi, internet, local area networks, or the like.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn paths there through. Thus, it is important to have continuous features remain continuous within the map data as provided by embodiments herein.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Additional data sources can include OEM vehicles that may provide camera images, camera detections, radar information, LiDAR information, ultrasound information, and/or other sensing technologies. Also, remote sensing, such as aerial or satellite photography, can be used to generate map geometries directly or through machine learning as described herein. The map database 108 may include the digital map data for a geographic region or for an entire mapped space, such as for one or more countries, one or more continents, etc. The map database 108 may partition the mapped space using spatial partitions to segment the space into map tiles that are more manageable than the entire mapped space.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems including in conjunction with autonomous and semi-autonomous navigation systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In certain embodiments, the end user device or mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. End user devices may optionally include automated computer systems, such as map data service provider systems and platforms as the map may be processed, utilized, or visualized via one or more other computing systems. An end user can use the mobile device 114 for navigation and map functions such as guidance and map display, for example, and for determination of one or more personalized routes or route segments based on one or more calculated and recorded routes, according to some example embodiments.

While the mobile device 114 may be used by an end-user for navigation, driver assistance, or various other features, the mobile device 114 may provide map data to the map services provider 116 for purposes of updating, building, restoring, or repairing the map database 108, for example. The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. While probe data is described herein as being vehicle probe data, example embodiments may be implemented with pedestrian probe data, marine vehicle probe data, or non-motorized vehicle probe data (e.g., from bicycles, skateboards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 4. The apparatus, such as that shown in FIG. 4, may be specifically configured in accordance with an example embodiment of the present disclosure for revising map geometry based on a detailed analysis of probe data and existing map geometry. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Embodiments described herein can further employ a processer embodied by a Graphics Processing Unit (GPU) specifically configured for neural network implementations and/or image processing capitalizing on efficient processing capabilities using multiple parallel operations As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Embodiments described herein identify erroneous lane line geometry occurrences and correct the lane line geometry using a machine learning model to predict the geometry where incorrect or missing lane line geometry is identified. When lane line geometry such as lane markings, centerlines, curbs, etc. are detected by a machine learning model of example embodiments, the detected lane line geometry can include wrong lane line geometry (e.g., different than ground truth or actual lane line geometry). The detected lane line geometry can include wrong lane line geometry and even omitted or missing lane line geometry. Interpolation and extrapolation rely on heuristics or statistics about lane line geometry in certain situations. However, the heuristics or statistics based interpolation algorithms cannot cover all road geometries. For instance, if a missing part of lane line geometry includes irregular poly lines or curvatures, heuristic interpolation algorithms cannot reliably determine the correct lane line geometry.

Embodiments described herein determine areas of broken lane line geometry based on representations of lane line geometry in a road network. These representations can be images, such as aerial images. Optionally, these representations can be point clouds, such as those generated from LiDAR. A representation of lane line geometry includes data that identifies lane line geometry of a road network or portion thereof. An image may be the most well-understood type of such a representation; however, embodiments described here are not limited to images such as photographic images as input data, but can employ a variety of types of representation data. Similarly, the output from the inpainting process described herein can be in the same or different format as the input, and can be generally referred to as a corrected representation or a representation with corrected lane line geometry, for example.

Using machine learning, embodiments described herein learn various types of road shapes and a trained machine learning model can be generalized to predict missing or wrong lane geometry areas reliably and efficiently. Embodiments do not depend on heuristics or statistics of local geometric information. The machine learning model to correct the wrong or missing lane geometry lines is an image inpainting technique as graphically illustrated in FIG. 5. As illustrated, erroneous lane line geometry is detected in representation 305 denoted by dashed circle 310. In the illustrated embodiment, the erroneous lane line geometry is missing lane line geometry elements. A mask is applied to the region of the erroneous lane line geometry as shown in representation 315 with mask 320. The mask 320 and representation 315 are input to an image inpainting model 325, from which the lane line geometry is established. The image inpainting model of an example embodiment includes a generator and a discriminator to optimally produce the inpainted corrected lane line geometry as detailed further below. Corrected lane line geometry is constructed within the image to form a corrected lane line geometry representation 335 including an intersection where the missing lane line geometry was present.

A detection model is employed to detect an area having incorrect lane line geometry. Detection of omitted lane line elements can be established in some embodiments by discontinuities. Certain incorrect lane line geometry elements can also be determined based on discontinuous elements or lane line elements having angles or turns that fail to satisfy certain criteria. A detection model processes a representation of a road network and from the representation, can establish which part of the representation is incorrect. The detection model is a type of classifier that classifies a representation or portion of a representation having an error. In the embodiment of FIG. 5, the discontinuities in lane lines within circle 310 are identified as erroneous lane line geometries.

The detection model detects which area within the representation needs to be corrected through inpainting an image, such as representation 305 of FIG. 5, can be divided into a number of sub-areas, such as four sub-areas. FIG. 6 illustrates representation 305 divided into sub-areas 306, 307, 308, and 309. The detection model can identify the error in the lane line geometry in sub-area 306 with discontinuities of the lane line geometry. Representations such as representation 305 of FIG. 6 can also be employed as training data. FIG. 7 illustrates three example representations that can be used as training data for the detection model. As shown, representation 410 is divided into four sub-areas (0) through (3). Discontinuities are identified in the lane line geometry of representation 410 in the sub-area (3). Training data representation 420 also includes lane line geometry errors identified as breaks in the lane line geometries or omitted portions thereof. If the image 420 is divided into four sub-areas as with image 410, the identified error is found in sub-area (3). Referring to representation 430, missing lane line geometry data is found in the region of sub-area (2). Once the detection model is trained the areas of a representation that require correction can be efficiently identified. The mask areas can be decided within the sub-area having the lane line geometry errors, and a mask area can be identified within the sub-area. Using the mask established through the detection model, the image inpainting model can be used to correct the lane line geometry within the representation.

FIG. 8 illustrates the aforementioned process including receiving an input representation 500 having an area of incorrect lane line geometry. The incorrect area detection model 505 identifies the incorrect lane line geometry in the top left sub-image of representation 510. A mask is created within the sub-area and is illustrated in representation 520. The image inpainting model 525, described further below, determines the appropriate lane line geometry and creates the representation 530 with the area of incorrect lane geometry corrected. While the embodiments of FIGS. 6 and 8 include four sub-areas, the representations can be subdivided into any number of sub-areas. Further, the number of sub-areas may be determined based on a coverage area of the representation. For example, a sub-image may be limited to no smaller than five meters across, and no more than one hundred meters across. The sub-area determination improves processing efficiency through limiting the area within which a mask determination is made, and limits the area processed through the image inpainting model.

Image inpainting models can be developed to fill in missing areas of representations including images such as photographic images. A "Globally and Locally Consistent Image Completion" (GLCIC) model is a well-performed image inpainting for photographic images. The GLCIC model is a type of conditional GAN and the architecture of GLCIC has a limited number of dilated convolution layers in a generator side along with two multi-scale discriminators. While the GLCIC model provides good inpainting results in photographic images, the GLCIC model does not process representations with lane line geometry well. Embodiments described herein provide a GLCIC model with improved sharpness and clarity through a revised architecture for better inpainting, specifically for lane line geometries.

The GLCIC model employed by embodiments described herein is unique and distinct from prior embodiments as the model is adapted to process representations for inpainting of lane line geometries. The GLCIC model of example embodiments includes added deeper dilated convolution layers such that the model can train a wider range around a target inpainting area during the model training. Generally, an image inpainting model for photographic images needs to train the relation between a target area to fill in and the outer area around the target. Said differently, image inpainting models for photographs rely heavily on what is found in the image outside of the area to be inpainted to generate the inpainted area. Such a model may employ four dilated convolution layers for photographic images. However, for lane line geometry representation inpainting, applicant has determined that additional deeper dilated convolution layers provide more accurate and repeatable results since the target area that needs to be restored is related to the shape of lane lines of all areas of the representation rather than the representation itself. Thus, the deeper dilated convolution layers can be useful to inpaint the missing area.

Dilated convolution layers introduce a dilation rate to the convolutional layers to define a spacing between values in a kernel. The receptive field does not match the size of a kernel, but the scale of the receptive field is larger. If the dilation factor of a 3×3 kernel is two, the receptive field size is 7×7. If a dilation factor of a 3×3 kernel is four, the receptive field is 15×15. However, the number of parameters associated with each layer is identical. The receptive field grows exponentially while the number of parameters grows linearly. By using dilated convolutions, the network is able to understand the context of a representation without employing expensive fully-connected layers and can handle images of different sizes.

FIG. 9 illustrates an image inpainting model architecture for lane line geometry correction according to an example embodiment of the present disclosure. As shown, an image mask 600 is received including a masked area 605 along with the representation of lane line geometry 610 and the mask of the area 615. The mask is established, in some embodiments, based on the incorrect area detection model 505 as shown in FIG. 8 and includes the area in which the lane line geometry is incorrect. The mask 600 and representation of lane line geometry 610 are input to the Generator 620. The Generator 620 of example embodiments described herein includes eight dilated convolution layers 625. These eight dilated convolution layers include a dilation factor from two to nine. The dilated convolution layers can be arranged in some embodiments with increasing dilation factor, while other example embodiments can employ a decreasing dilation factor. The increasing dilation factor architecture provides improved image inpainting over decreasing dilation factor; however, either architecture can be employed as an improvement over interpolation applications for inpainting of lane line geometry as described herein. While a standard GLCIC model may apply a Mean Square Error (MSE) loss function for generator and Binary Cross Entropy (BCE) loss function for the Discriminator 650 described further below, embodiments provided herein apply more sophisticated loss functions to increase the inpainted image quality and to shorten the training time of the model.

Perceptual loss is based on the difference of the generated target image Convolutional Neural Network (CNN) feature maps and it improves the inpainted image quality. Perceptual loss can be used in the Generator 620 in place of a Mean Square Error loss function. The Generator generates the small area that was masked producing an output of a restored or repaired image 630 with the incorrect lane line geometry corrected at 635.

The output of the Generator 620 is then input to the Discriminator 650, where the Generator 620 attempts to produce an image that convinces the Discriminator 650 that the image is real and accurate to ground truth. The Discriminator 650 measures whether the output of the Generator 620 is good or bad, producing a quality measure thereof. The Discriminator 650 measures two aspects of the input image 630—the larger scale full representation 630 through a first discriminator part or global discriminator 640 of the Discriminator and the quality of the generated representation of the incorrect lane line geometry corrected at 635 through a second discriminator part or local discriminator 645 of the Discriminator. The output of the Discriminator 650 is a score. For example, a score may be a measure between zero and one, where a score of 0.9 or greater reflects a good correction of the incorrect lane line geometry (e.g., close to ground truth), where a score of around 0.3 or less reflects a bad correction of the incorrect lane line geometry. The scores can be any relative measure, with a higher score reflecting a better representation of ground truth lane line geometry. Further, the thresholds used for a "good" or "bad" representation can be user selected or learned, such that any threshold values for a score can be used to either accept an inpainting result as accurate or reject an inpainting result as inaccurate. These thresholds can be tuned to provide a balance between performance and processing speed, where if a 90% accurate representation can be achieved in half of the time a 93% accurate representation can be achieved, 90% may be deemed preferable for example. In this way the Generator 620 is competing with the Discriminator 650 to convince the Discriminator that the generated representation is natural, real, and accurate.

Embodiments employ eight dilated convolution layers whereas typical GLCIC uses fewer layers since they are not constrained as rigidly as lane line geometry features are. While the Generator 620 only restores part of a representation, the Discriminator 650 is concerned with how the whole representation presents information, such that the use of eight dilated convolution layers is uniquely beneficial in the case of lane line geometry modeling.

The Discriminator 650 of example embodiments uses Relativistic Least Squares GAN loss function. The Relativistic Least Squares GAN loss function achieves better quality inpainted results and results in faster training, particularly when compared to the BCE loss function. The generated inpainted result of example embodiments provides improved line smoothness and overall sharper lines than a conventional GLCIC.

Generally, image inpainting models in machine learning aim to inpaint on the real-world photographic images. Such inpainting has not been implemented for lane line geometry images as described herein. An advantage of embodiments described herein includes the usability of a modified image inpainting model around lane line geometry detection problem. The proposed model extended from the GLCIC model architecture through using deeper dilated convolution layers, adopting a suitable discriminator loss function, and adopting a suitable generator loss function to improve inpainting and produce higher quality results with images reflecting lane line geometry that approximates the ground truth. Another advantage of embodiments described herein is that the image inpainting model can restore any type of lane line geometry whereas interpolation-based models are limited and do not work well with curvatures or irregular shapes of lane line geometry.

Image inpainting models for lane line geometry as described herein are improved through the use of larger training datasets including various road types such that the model learns various types, shapes, and configurations of roads and lane lines. Therefore, using a well-trained model, the inpainted result can benefit from a large corpus of training data and road types to understand how missing or incorrect lane line geometry can be corrected through inpainting of a masked area.

The inpainting of lane line geometry may have a low quality for certain types of road conditions. When input probe intensity is low, the probe histogram image is strong enough to restore the representation into lane line geometry (e.g., sparse probe data points). For certain road types that are of complex road geometries, restoring the lane line geometry is difficult. For example, multi-lane geometries, intersection geometries, T-junction geometries, etc. To improve the quality of inpainting of lane line geometry, embodiments can use training data of these specific complex road geometries. Representations such as images of known complex road geometries are collected with specific types of road geometry selected. This selection enables a road type classifier to be constructed. The training dataset of road type classifier includes only one specific road geometry. Map data can be used to identify specific road geometry types such that selection of the training dataset can be automated. If there are insufficient training representations, representation augmentation can be employed to increase the volume of training data. Further, representation augmentation can be used to improve an already trained machine learning model through a substantial increase in the training data available to the model.

FIG. 10 illustrates an example embodiment of representation augmentation. As shown, an original representation 660 of an intersection is augmented to be flipped (inverted top-to-bottom) in augmented representation 665, rotated in augmented representation 670 and augmented representation 675, and shifted or translated in augmented representation 680. Each of these representations can be used as training data thereby multiplying the number of training data representations through these augmentation operations. FIG. 11 illustrates the implementation of augmented representations as training data. As shown, the original representation set for training is obtained at 682. Representation augmentation is performed at 684, such as using the technique described in FIG. 10 and reproduced at 686. The training data with representation augmentation 688 includes considerably more representations for training than the original representation set. The road type classifier 690 is trained on the training data and specific road type geometry labels for representations of the original representation set are generated at 692.

Employing the advanced identification of complex road geometries an advanced image inpainting model can be used to generated inpainted lane line geometry of these complex road geometries. The image inpainting model of example embodiments described herein can identify from a representation a T-intersection where three road segments intersect (e.g., in original representation 660 of FIG. 10) based on the road type classifier trained on training data identifying T-intersections. This understanding of the T-intersection geometry is used by the image inpainting model to produce improved and more accurate lane line geometry. Intersection type identification can be established based on manual labeling of training data or based on lane line geometry of the intersection. Intersections and intersection types can be established based on the number of road segments intersecting or crossing one another, and the number of individual lanes of each road segment, for example.

Lane line geometry of example embodiments provided herein can be instrumental in establishing turn maneuvers at intersections. When broken lane line geometry exists, lane line geometry cannot reliably be used by autonomous vehicles for autonomous control through the region of broken lane lines. While autonomous vehicles can employ sensor data collected on board the vehicle for control within an environment, the use of lane line geometry enhances autonomous vehicle control and provides redundancy that improves efficiency, effectiveness, and safety of autonomous vehicle control. The inpainting of intersections to identify lane line geometry within an intersection can establish turn maneuvers within an intersection. FIG. 12 illustrates an example embodiment of ground truth turn maneuvers of an intersection in image 694. When broken lane line geometry exists in the map representation of the data, embodiments described herein generate a mask over the broken lane line geometry as reflected in image 696. Using the embodiments described above, an inpainted restoration of the lane line geometry is generated as shown in image 698.

Intersecting road segments, as viewed from overhead in a map, do not always include turn maneuvers. For example, an overpass/underpass crossing of roads is an intersection of road segments in an overhead view. FIG. 13 illustrates an overpass/underpass example where a first road crosses over a second road. Such an intersection can be treated in the same manner as other inpainting examples described above, with the intersection type being classified as an overpass/underpass intersection where the roads do not actually intersect with one another on the same plane. Referring to FIG. 13, the ground truth lane line geometry is illustrated in image 700. When broken lane line geometry exists as identified through a detection model described above, a mask is generated over the broken lane line geometry as shown in image 702. Using the inpainting model described herein, the lane line geometry restoration is inpainted as shown in image 704. Embodiments identify intersections within map data, and among those intersections identify intersections with broken lane line geometry. Through identification of a type of intersection, the inpainting model trained on representations of the same type of intersection can accurately generate inpainted and restored lane line geometry.

FIGS. 14, 15, and 16 illustrate flowcharts depicting methods according to example embodiments of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present disclosure and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

An operation of an example apparatus will herein be described with reference to the flow chart of FIG. 14. The illustrated method may be performed, for example, by apparatus 200 using processor 202 with program code instructions stored in memory 204 to cause the apparatus to perform the operations of the method of FIG. 14. As shown, apparatus is caused to receive a representation of lane line geometry for one or more roads of a road network at 710. This representation may be in the form of an image, for example. At 720, an area within the representation including broken lane line geometry is identified. A masked area of the are within the representation including the broken lane geometry is generated at 730. The representation with the masked area is processed at 740 through an inpainting model, where the inpainting model includes a generator network, where the representation is processed through the generator network that includes dilated convolution layers for inpainting of the masked area with corrected lane line geometry in a corrected representation. At 750 a map database is updated to include the corrected lane line geometry in place of the area including the broken lane line geometry based on the corrected representation.

An operation of another example apparatus will herein be described with reference to the flow chart of FIG. 15. The illustrated method may be performed, for example, by apparatus 200 using processor 202 with program code instructions stored in memory 204 to cause the apparatus to perform the operations of the method of FIG. 15. As shown, a representation of lane line geometry including a masked area representing an area of broken lane line geometry is received at 810. The representation is processed at 820 using an inpainting model including a generator to produce a corrected representation where the masked area is inpainted to correct the broken lane line geometry, where the generator processes the representation through one or more convolution layers and at least eight dilated convolution layers having dilation factors from two to nine to generate inpainting of corrected lane line geometry in the corrected representation. The corrected representation is processed at 830 through a discriminator of the inpainting model, where the discriminator discerns a score reflecting a quality measure of the corrected representation. At 840, a map database is updated based on the corrected representation in response to the score satisfying a predetermined value.

An operation of still another example apparatus is described herein with reference to FIG. 16. A representation of lane line geometry is received at 910 for one or more roads of a road network. Within the representation an area is identified as broken lane line geometry of an intersection using a machine learning model trained to detect road geometry intersections at 920. A masked area of the broken lane line geometry of the intersection within the representation is generated at 930. The representation is processed at 940 with the masked area using an inpainting model to generate an inpainted result within the masked area of restored lane line geometry of the intersection, where the inpainting model is trained using a set of representations identified as lane line geometry of intersections. A map database is updated at 950 to include the restored lane line geometry of the intersection in place of the broken lane line geometry of the intersection. This restored lane line geometry is used in an example embodiment for autonomous vehicle control through the intersection.

In an example embodiment, an apparatus for performing the methods of FIGS. 14, 15 and/or 16 above may include a processor (e.g., the processor 202) configured to perform some or each of the operations (710-750, 810-840, and/or 910-950) described above. The processor may, for example, be configured to perform the operations (710-750, 810-840, and/or 910-950) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 710-750, 810-840, and/or 910-950 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
   receive a representation of lane line geometry including a masked area representing an area of broken lane line geometry;
   process the representation using an inpainting model including a generator to produce a corrected representation wherein the masked area is inpainted to correct the broken lane line geometry, wherein the generator processes the representation through one or more convolution layers and at least eight dilated convolution layers having dilation factors from two to nine to generate inpainting of corrected lane line geometry in the corrected representation;
   process the corrected representation through a discriminator of the inpainting model, wherein the discriminator discerns a score reflecting a quality measure of the corrected representation; and
   update a map database based on the corrected representation in response to the score satisfying a predetermined value.

2. The apparatus of claim 1, wherein causing the apparatus to process the corrected representation through the discriminator comprises causing the apparatus to:
   process an inpainted masked area of the corrected representation through a first discriminator; and
   process the corrected representation through a second discriminator.

3. The apparatus of claim 2, wherein the apparatus is further caused to:
   combine a result from the first discriminator with a result from the second discriminator to generate the score reflecting the quality measure of the corrected representation.

4. The apparatus of claim 1, wherein the inpainting model that includes the generator trains the inpainting model using a perceptual loss function.

5. The apparatus of claim 4, wherein the inpainting model that includes the discriminator is trained model using a Relativistic Least Square Generative Adversarial Network loss function.

6. The apparatus of claim 1, wherein the generator is trained using training representations of lane line geometry.

7. The apparatus of claim 1, wherein causing the apparatus to update a map database based on the corrected representation in response to the score satisfying a predetermined value comprises causing the apparatus to update lane line geometry of the map database with lane line geometry of the corrected representation.

8. The apparatus of claim 7, wherein the map database including updated lane line geometry is used for at least one of navigational assistance or at least partially autonomous vehicle control through road segments associated with the updated lane line geometry.

9. A computer program product comprising at least one non-transitory computer-readable storage medium having computer-executable program code instructions stored therein, the computer-executable program code instructions comprising program code instructions to:
   receive a representation of lane line geometry including a masked area representing an area of broken lane line geometry;
   process the representation using an inpainting model including a generator to produce a corrected representation wherein the masked area is inpainted to correct the broken lane line geometry wherein the generator processes the representation through one or more convolution layers, and at least eight dilated convolution layers having dilation factors from two to nine to generate inpainting of corrected lane line geometry in the corrected representation;
   process the corrected representation through a discriminator of the inpainting model, wherein the discriminator discerns a score reflecting a quality measure of the corrected representation; and
   update a map database based on the corrected representation in response to the score satisfying a predetermined value.

10. The computer program product of claim 9, wherein the program code instructions to process the corrected representation through the discriminator comprise program code instructions to:
    process an inpainted masked area of the corrected representation through a first discriminator; and
    process the corrected representation through a second discriminator.

11. The computer program product of claim 10, further comprising program code instructions to:
    combine a result from the first discriminator with a result from the second discriminator to generate the score reflecting the quality measure of the corrected representation.

12. The computer program product of claim 9, wherein the inpainting model that includes the generator trains the inpainting model using a perceptual loss function.

13. The computer program product of claim 12, wherein the inpainting model that includes the discriminator is trained using a Relativistic Least Square Generative Adversarial Network loss function.

14. The computer program product of claim 9, wherein the generator is trained using training representations of lane line geometry.

15. The computer program product of claim 9, wherein the program code instructions to update a map database based on the corrected representation in response to the score satisfying a predetermined value comprise program code instructions to update lane line geometry of the map database with lane line geometry of the corrected representation.

16. The computer program product of claim 15, wherein the map database including updated lane line geometry is used for at least one of navigational assistance or at least partially autonomous vehicle control through road segments associated with the updated lane line geometry.

17. A method comprising:
    receiving a representation of lane line geometry including a masked area representing an area of broken lane line geometry;
    processing the representation using an inpainting model including a generator to produce a corrected representation wherein the masked area is inpainted to correct the broken lane line geometry wherein the generator processes the representation through one or more convolution layers, and at least eight dilated convolution layers having dilation factors from two to nine to generate inpainting of corrected lane line geometry in the corrected representation;
    processing the corrected representation through a discriminator of the inpainting model, wherein the discriminator discerns a score reflecting a quality measure of the corrected representation; and updating a map database based on the corrected representation in response to the score satisfying a predetermined value.

18. The method of claim 17, wherein causing the apparatus to process the corrected representation through the discriminator comprises causing the apparatus to:
   process an inpainted masked area of the corrected representation through a first discriminator; and
   process the corrected representation through a second discriminator.

19. The apparatus of claim 18, wherein the apparatus is further caused to:
   combine a result from the first discriminator with a result from the second discriminator to generate the score reflecting the quality measure of the corrected representation.

20. The apparatus of claim 17, wherein updating a map database based on the corrected representation in response to the score satisfying a predetermined value comprises updating lane line geometry of the map database with lane line geometry of the corrected representation.

\* \* \* \* \*

UNITED STATES PATENT AND TRADEMARK OFFICE
CERTIFICATE OF CORRECTION

PATENT NO. : 12,013,255 B2  
APPLICATION NO. : 17/645097  
DATED : June 18, 2024  
INVENTOR(S) : Hong Page 1 of 1

It is certified that error appears in the above-identified patent and that said Letters Patent is hereby corrected as shown below:

In the Claims

Column 29,
Lines 11 and 17, Claims 19 and 20, "The apparatus", each occurrence, should read --The method--.

Signed and Sealed this  
First Day of October, 2024

Katherine Kelly Vidal  
*Director of the United States Patent and Trademark Office*